US011710909B2

(12) United States Patent
Saitto et al.

(10) Patent No.: US 11,710,909 B2
(45) Date of Patent: Jul. 25, 2023

(54) MULTI-BEAM REFLECTOR ANTENNA FOR SATELLITE APPLICATIONS

(71) Applicant: Telespazio S.p.A., Rome (IT)

(72) Inventors: Antonio Saitto, Rome (IT); Marco Brancati, Rome (IT)

(73) Assignee: Telespazio S.P.A., Rome (IT)

( * ) Notice: Subject to any disclaimer, the term of this patent is extended or adjusted under 35 U.S.C. 154(b) by 229 days.

(21) Appl. No.: 17/172,583

(22) Filed: Feb. 10, 2021

(65) Prior Publication Data
US 2021/0249788 A1 Aug. 12, 2021

(51) Int. Cl.
| | |
|---|---|
| H01Q 21/22 | (2006.01) |
| H01Q 3/20 | (2006.01) |
| H04B 7/185 | (2006.01) |
| H01Q 25/00 | (2006.01) |
| H01Q 19/17 | (2006.01) |
| H01Q 3/10 | (2006.01) |

(52) U.S. Cl.
CPC ............... *H01Q 21/22* (2013.01); *H01Q 3/10* (2013.01); *H01Q 3/20* (2013.01); *H01Q 19/17* (2013.01); *H01Q 25/007* (2013.01); *H04B 7/18517* (2013.01)

(58) Field of Classification Search
CPC ............ H01Q 21/22; H01Q 3/10; H01Q 3/20; H01Q 19/17; H01Q 25/007; H01Q 3/267; H04B 7/18517; H04B 7/18519
See application file for complete search history.

(56) References Cited

U.S. PATENT DOCUMENTS

| | | |
|---|---|---|
| 4,586,051 A | 4/1986 | Saitto et al. |
| 2010/0231442 A1* | 9/2010 | Craig ................. H04B 7/18515 342/354 |

FOREIGN PATENT DOCUMENTS

WO    WO 2018/190794 A1    10/2018

OTHER PUBLICATIONS

Centureli et al., Feed Array Metrology and Correction Layer for Large Antenna Systems in ASIC Mixed Signal Technology, Proceedings of APIE, IEEE, US, vol. 9150, Aug. 4, 2014, p. 91500F-91500F, 12 pages.
Italian Search Report dated Sep. 17, 2018 for Italian Patent Application 201800001307.

* cited by examiner

*Primary Examiner* — Andrea Lindgren Baltzell
*Assistant Examiner* — Yonchan J Kim
(74) *Attorney, Agent, or Firm* — McCarter & English, LLP

(57) ABSTRACT

A feed array is provided that may be installed in a reflector antenna provided with a single or dual reflector optics. The feed array includes a radiating array for transmitting/receiving radiofrequency signals, a digital beam forming network, a reception conversion unit for applying a frequency down-conversion and an analog-to-digital conversion to incoming radiofrequency signals to obtain incoming digital signals. The feed array includes a transmission conversion unit for applying a digital-to-analog conversion and a frequency up-conversion to outgoing digital signals generated by the digital beam forming network to obtain outgoing radiofrequency signals. The digital beam forming network processes the incoming digital signals by using a reception matrix, and generates the outgoing digital signals by using a transmission matrix, with the matrices computed based on electric field values measured by the radiating array in the focal region.

20 Claims, 18 Drawing Sheets

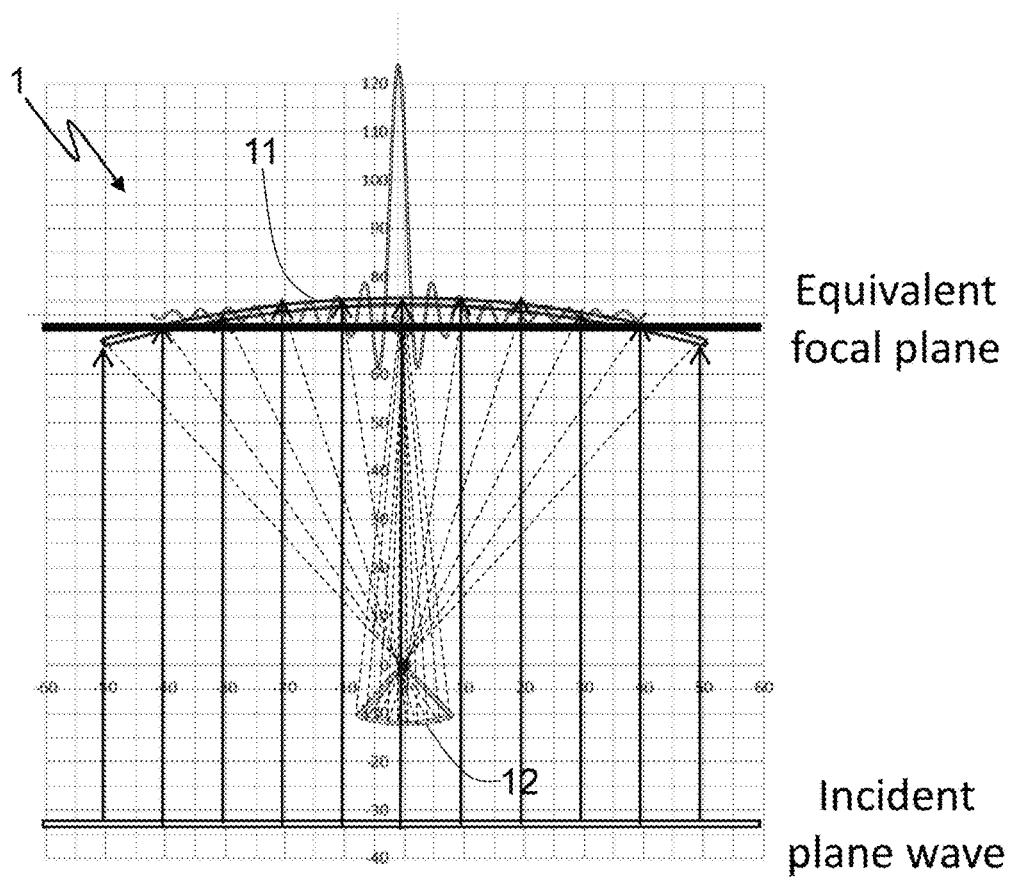
Equivalent focal plane
Incident plane wave
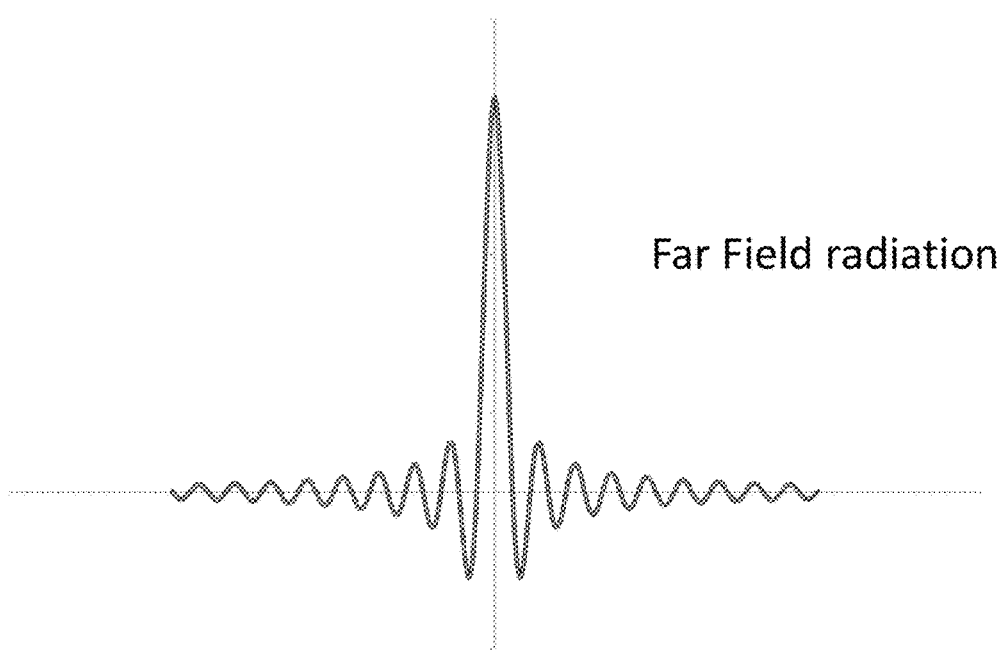
Far Field radiation pattern
Fig. 3

MULTI-BEAM REFLECTOR ANTENNA FOR SATELLITE APPLICATIONS

CROSS-REFERENCE TO RELATED APPLICATIONS

This patent application claims priority from Italian patent application no. 102020000002563 filed on Feb. 10, 2020, the entire disclosure of which is incorporated herein by reference.

TECHNICAL FIELD OF THE INVENTION

The present invention concerns, in general, a multi-beam reflector antenna for satellite applications. More specifically, the present invention relates to an innovative feed array for reflector antennas and to a reflector antenna exploiting said innovative feed array.

BACKGROUND ART

As is known, in addition to traditional large satellites, recent technological developments in space/satellite sector have led to the feasibility of making smaller and smaller satellites, such as the so-called microsatellites (often made in the form of cubesats), nanosatellites, picosatellites, femtosatellites, etc., which are capable of performing an increasing number of functions (e.g., remote sensing, scientific experiments, in-orbit testing of components, etc.), while manufacturing times and costs are reduced. This kind of satellite provides a series of technical and non-technical (e.g., economical/commercial) advantages with respect to traditional larger satellites and, hence, is becoming increasingly used for space missions, in particular for those having a limited mission budget, or for large satellite constellations requiring a huge number of satellites. Additionally, the feasibility of manufacturing small mass and size, low-cost satellites is enabling the opening of the space/satellite market also to new types of satellite operators, such as countries, institutions (e.g., universities and research centers), industries and companies, traditionally excluded therefrom (e.g., for cost reasons).

In recent times, several large constellations of low-Earth-orbit (LEO) small satellites (or smallsats) have been planned to be launched in the next future in order to provide global Internet coverage and high-speed broadband Internet access.

In particular, these LEO smallsats will be located at approximately 1,000/1,200 km from Earth's surface with very small footprint, will have smaller manufacturing and launch costs than geostationary satellites (also referred to as geosynchronous equatorial orbit (GEO) satellites) and medium Earth orbit (MEO) satellites, will be characterized by very low latency times (in particular, latency times that will be lower than geostationary and MEO satellites and even than optical fibers currently used for long-distance terrestrial communications), and will need far fewer hops (i.e., fewer repeaters/routers).

However, this kind of constellation requires a huge number (i.e., hundreds or even thousands) of smallsats in order to provide global coverage and high-speed broadband access.

Examples of antenna architectures exploitable for LEO missions are provided in M. Cooley's, *"Phased Array-Fed Reflector (PAFR) Antenna Architectures for Space-Based Sensors"*, 2015 IEEE Aerospace Conference, 7-14 Mar. 2015, which relates to hybrid antenna designs using Phased Array Fed Reflectors (PAFRs) that provide a compromise between reflectors and Direct Radiating phased Arrays (DRAs). In fact, PAFRs provide many of the performance benefits of DRAB while utilizing much smaller, lower cost feed arrays. The primary limitation associated with hybrid PAFR architectures is electronic scan range; approximately +/−5 to +/−10 degrees is typical, but this range depends on many factors. For LEO applications, the Earth field of view (FOV) is approximately +/−55 degrees, which is well beyond the range of electronic scanning of PAFRs. However, for some LEO missions, limited scanning is sufficient, or the concept of operations (CONOPS) and space vehicle designs can be developed to incorporate a combination of mechanical slewing and electronic scanning.

With specific reference to ground segment, conventional antennas used on Earth's surface for data transmission/reception to/from geostationary satellites are sensitive to line of sight (especially, in Ku and Ka bands); namely, said antennas can operate only by specifically pointing at the fixed space position at which a geostationary satellite is located.

Instead, a moving LEO satellite necessarily requires ground terminals and ground stations equipped with steerable antennas having high-performance steering mechanisms.

Nowadays, ground segments are typically based on the use of reflector antennas employing single or dual reflector optics along with single feeds or feed arrays.

Unfortunately, the reflector antennas currently employed in ground segments (in particular, those designed for geostationary satellites) are unsuitable for tracking LEO satellites.

An example of reflector satellite antenna fitted with a feed array is disclosed in U.S. Pat. No. 4,586,051 A, which relates to a reflector distortion compensation system for multiple-beam satellite antennas.

In particular, the reflector distortion compensation system according to U.S. Pat. No. 4,586,051 A comprises:

a reflector and at least one beam forming network having a symmetrical arrangement of peripheral feeds around a central feed;

means for detecting distortions in said reflector, said detecting means comprising a remote transmitter providing a transmit signal to said feeds via said reflector and such that rays of said transmit signal are substantially parallel with each other when arriving at said reflector, a circuit having one input connected to said central feed and another input selectively switchable between at least two of said peripheral feeds in order to obtain linear and non-linear error signals from said circuit in response to corresponding linear and non-linear distortions;

means for generating linear and non-linear distortion correction signals in response to said error signals; and means for correcting said linear and non-linear distortions of said reflector by correcting an attitude of said reflector and characteristics of said beam forming network as required.

The subject-matter of correcting errors related to antenna geometry and to antenna distortions in large reflector and large feed antennas is discussed also in F. Centureli et al., *"Feed Array Metrology and Correction Layer for Large Antenna Systems in ASIC Mixed Signal Technology"*, Modeling, Systems Engineering, and Project Management for Astronomy VI, Proc. of SPIE, Vol. 9150, 4 Aug. 2014. In particular, this paper deals with a possible use of a feed array present in a large antenna system as a layer for measuring the antenna performance with a self-test procedure and a possible way to correct residual errors of the antenna geometry and of the antenna distortions.

Object and Summary of the Invention

LEO smallsats constellations require a meaningful change of current ground segment architecture with the related risk of losing, due to the ground segment, the cost and performance advantages created by the space segment.

In this connection, it is worth noting that, in order to communicate in real time and with extremely high bit rates via LEO satellites, hundreds of hub stations are necessary on the ground, which should be connected via optical fibre backhaul networks to the terrestrial backbones, and whose distribution on Earth's surface, installation costs, periodical maintenance and protection in terms of security and safety should be optimized.

From the foregoing, it is evident that the reuse of space centres currently available on Earth's surface could be advantageous, but this would imply the availability of large installation areas and the non-secondary problem of construction authorizations/permissions to build new large ground infrastructures (in particular, new large antennas) in already crowded areas.

Large antennas (considering inside this category reflector antennas with reflectors having diameters equal to or larger than five meters) currently installed on Earth's surface for communicating with telecommunications geostationary satellites are substantially pointed always at one and the same space position where a geostationary satellite is located, wherein their large reflectors are typically moved only by few hundredths of degree per diem. Thence, very heavy and large antennas can track telecommunications geostationary satellites with high accuracy by performing only small movements around a nominal position.

As is known, the situation is completely different for LEO satellites, which move at a speed of approximately 26,000 km/h. This requires extremely high pointing performance from ground antennas.

Additionally, in case of large LEO constellations, the ground antennas should be pointed at many satellites in very short time, whereby the possibility of guaranteeing high pointing performance for antennas fitted with mechanical pointing mechanisms is almost impractical.

Therefore, a first object of the present invention is that of providing an antenna for ground stations of LEO satellites, which antenna allows overcoming, at least in part, the above technical drawbacks. More specifically, the first object of the present invention is that of providing a high pointing performance, low-cost antenna solution for ground hub stations for LEO smallsat constellations.

However, additionally, a second object of the present invention is that of providing an antenna solution suitable also for ground stations of non-LEO satellites, such as ground stations of MEO and/or GEO satellites.

Moreover, a third object of the present invention is that of providing an efficient antenna solution exploitable also on board satellites (such as LEO and/or MEO and/or GEO satellites).

These and other objects are achieved by the present invention in that it relates to a feed array and to a reflector antenna, as defined in the appended claims.

BRIEF DESCRIPTION OF THE DRAWINGS

For a better understanding of the present invention, preferred embodiments, which are intended purely as non-limiting examples, will now be described with reference to the attached drawings (not to scale), where:

FIG. 3 schematically illustrates a property of reflector antennas related to incident field distribution on focal plane;

DETAILED DESCRIPTION OF PREFERRED EMBODIMENTS OF THE INVENTION

Figure 1:
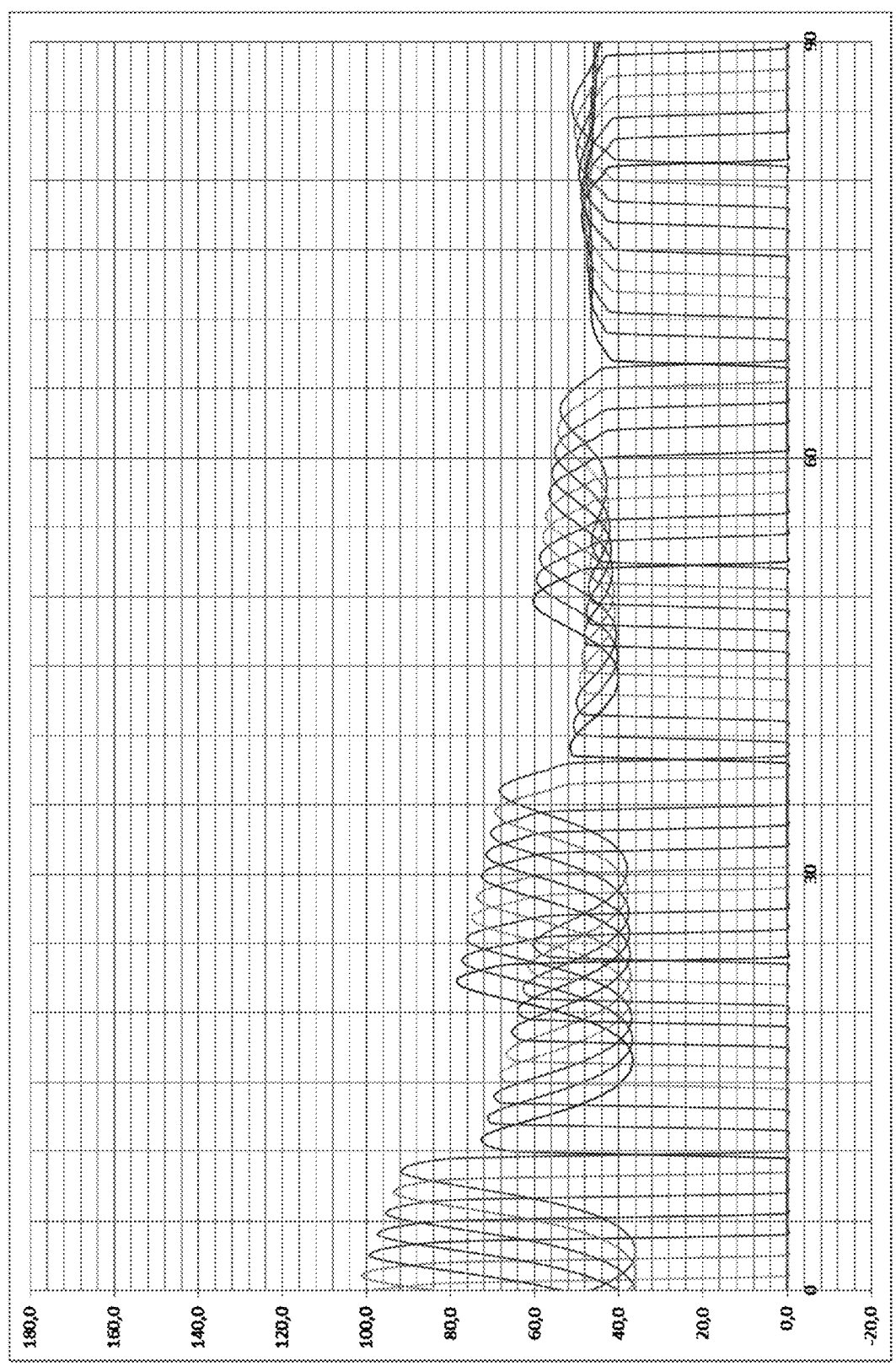
FIG. 1 schematically illustrates capability of an antenna according to an embodiment of the present invention to track in elevation several satellites on different LEOs.

The following discussion is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope consistent with the principles and features disclosed herein and defined in the appended claims.

The present invention stems from Applicant's smart idea of reusing existing ground antenna infrastructures (such as those designed to operate in C, X or Ku band that are often underloaded or no longer used) to make innovative multi-beam, high pointing performance ground antennas for LEO satellites, thereby enabling low-cost provision of ground hub stations for LEO smallsat constellations. In this way, the Applicant has conceived an innovative antenna solution whose exploitation is particularly advantageous for ground stations of LEO satellites. However, the Applicant has realized that, in addition to said specific application (i.e., ground stations of LEO satellites), said innovative antenna solution can be advantageously exploited also:
- for ground stations of non-LEO satellites (such as ground stations of MEO and/or GEO satellites); and
- on board LEO and/or MEO and/or GEO satellites (e.g., for telecommunications and/or synthetic aperture radar (SAR) applications).

With respect to existing ground antenna infrastructures, the present invention entails a relatively small number of modifications only in antennas' feeder section, without any need to redesign reflector optics and mechanics of existing large reflector antennas.

The innovative feeder section according to the present invention has the following three features:
- multiple beam availability for both transmission and reception to point at, and follow more satellite simultaneously;
- capability to correct errors related to reflector optics; and
- possibility of checking antenna performance in one shot thereby enabling predictive maintenance.

In particular, a first aspect of the present invention concerns a feed array for reflector antennas, which feed array is designed to be installed in a reflector antenna provided with a single or dual reflector optics, and includes:
- a radiating array arranged in a focal region of the single/dual reflector optics and operable to transmit and receive radiofrequency (RF) signals (preferably, microwave signals);
- digital beam forming means;
- reception (RX) conversion means connected between the radiating array and the digital beam forming means and designed to
  - apply a frequency down-conversion and an analog-to-digital conversion (and, conveniently, also a low noise amplification) to incoming RF signals received by the radiating array thereby obtaining incoming digital signals, and
  - provide the digital beam forming means with the incoming digital signals; and
- transmission (TX) conversion means connected between the radiating array and the digital beam forming means and designed to
  - apply a digital-to-analog conversion and a frequency up-conversion (and, conveniently, also a high power amplification) to outgoing digital signals generated by the digital beam forming means thereby obtaining outgoing RF signals, and
  - provide the radiating array with the outgoing RF signals to be transmitted by said radiating array.

The digital beam forming means are configured to:
process the incoming digital signals by using a reception matrix defined based on
- a first matrix for beam pointing in reception and
- a second matrix for compensating for errors in reception due to the single/dual reflector optics; and generate the outgoing digital signals by using a transmission matrix defined based on
- a third matrix for beam pointing in transmission and
- a fourth matrix related to errors in transmission due to the single/dual reflector optics.

In particular, said second and fourth matrices are computed based on electric field values measured by the radiating array in the focal region.

Preferably, the second matrix is computed to compensate for errors in reception due to the single/dual reflector optics and also to apply a first edge tapering function to be used in reception. Similarly, the fourth matrix is preferably designed to take account of errors in transmission due to the single/dual reflector optics and also to apply a second edge tapering function to be used in transmission.

Conveniently, the feed array is configured to compute the second matrix by:
- measuring complex values of electric field in the focal region by means of the radiating array;
- computing complex conjugate field phases based on the measured complex values of the electric field in the focal region; and
- computing the second matrix based on the complex conjugate field phases computed.

Again conveniently, the feed array is configured to compute the fourth matrix by:
- estimating phase shifts related to distortions of the single/dual reflector optics on the basis of the measured complex values of the electric field in the focal region; and
- computing the fourth matrix based on the estimated phase shifts.

More conveniently, the radiating array includes a plurality of radiating elements operable both in reception and transmission; wherein for each radiating element:
- the first matrix includes a corresponding reception beam pointing coefficient to be applied to an incoming digital signal coming from said radiating element;
- the second matrix includes a corresponding reflector error correction coefficient to be applied to the incoming digital signal coming from said radiating element;
- the reception matrix includes a corresponding reception weighting coefficient to be applied to the incoming digital signal coming from said radiating element, wherein said corresponding reception weighting coefficient is defined based on said corresponding reception beam pointing and reflector error correction coefficients;
- the digital beam forming means are configured to process the incoming digital signal coming from said radiating element by applying the corresponding reception weighting coefficient thereto;
- the third matrix includes a corresponding transmission beam pointing coefficient to be applied to an outgoing digital signal intended to be transmitted by said radiating element;
- the fourth matrix includes a corresponding reflector-error-related coefficient to be applied to the outgoing digital signal intended to be transmitted by said radiating element;
- the transmission matrix includes a corresponding transmission weighting coefficient to be applied to the outgoing digital signal intended to be transmitted by said radiating element, wherein said corresponding transmission weighting coefficient is defined based on said corresponding transmission beam pointing and reflector-error-related coefficients; and
- the digital beam forming means are configured to generate the outgoing digital signal intended to be transmitted by said radiating element by applying the corresponding transmission weighting coefficient.

Moreover, a second aspect of the present invention concerns a reflector antenna, which is designed to be installed in a ground station for satellites (e.g., LEO and/or MEO and/or GEO satellites) or on board a satellite (e.g., a LEO/

MEO/GEO satellite for telecommunications or SAR applications), which reflector antenna is:
- provided with a single or dual reflector optics; and
- equipped with the feed array according to the first aspect of the present invention.

For a better understanding of the present invention, several aspects and preferred embodiments thereof will be described in detail in the following paragraphs. In this connection, it is worth noting that, only for the sake of description simplicity and, hence, without losing generality, hereinafter the present invention will be described in detail with specific reference to ground stations for LEO satellites, remaining it clear that the present invention can be advantageously exploited, mutatis mutandis (more specifically, without any substantial modification), also for ground stations of MEO and/or GEO satellites and on board LEO/MEO/GEO satellites (e.g., for telecommunications or SAR applications).

1. Tracking of LEO Satellites by Large Antennas

As previously explained, tracking on the ground of LEO satellites is a very complex task due to dynamics of such satellites that requires highly demanding performance from antenna pointing mechanisms (in particular, more demanding pointing performance than geostationary satellites, with antenna rotation velocities even one thousand times higher than those ones in geostationary case).

In this connection, the Applicant has had the idea of using a reflector antenna fitted with a feed array equipped with one or more digital beam forming networks in order to exploit fast pointing speed of electronically steered beams, while still using also a slow mechanical pointing mechanism.

In particular, Applicant's idea is that of using a slow, coarse pointing (conveniently, in elevation) based on a mechanical mechanism in combination with an extremely fast, fine pointing (conveniently, in azimuth and elevation) based on an electronic mechanism.

More specifically, the antenna may be conveniently pointed at intermediate positions by the mechanical mechanism, and may conveniently track several satellites by electronically steering several beams around these intermediate positions (thereby leaving to the electronic mechanism a reduced steering angular cone compatible with typical electronic scan ranges, e.g., +/−10 degrees in elevation). In this way, a single antenna is capable of pointing at several LEO satellites of the same constellation by using different beams obtained by means of one or more digital beam forming networks.

In this connection, FIG. 1 schematically illustrates the capability of an antenna according to an embodiment of the present invention to track in elevation several satellites on different LEOs by using a slow mechanical pointing (i.e., a sort of "pointing bias" obtained mechanically) in combination with a fast electronic multi-beam pointing performed around "intermediate" pointing directions obtained via said slow mechanical pointing.

As for pointing in azimuth, it is worth noting that there is no difficulty in electronically changing azimuth pointing angle even by 180 degrees around pointing axis.

As previously explained, the present invention provides for the use of a reflector antenna equipped with a feed array, whereas the use of a DRA (i.e., a direct radiating phased array) represents a quite impractical solution (or, at least, an extremely problematic solution) for several reasons, such as the necessity of an extremely high number of radiating elements (along with the associated costs) and the difficulties of mechanically pointing large and heavy planar structures and of periodically checking configuration performance.

2. Feed Array

Typically, a large antenna is provided with a dual-reflector optics based on Cassegrain or Gregorian geometry.

Both these geometries allow arranging the feed system close to the paraboloid vertex or close to the centre of the antenna mechanical pedestal, in order to reduce electrical losses and simplify mechanical design and antenna maintenance.

Figure 2:
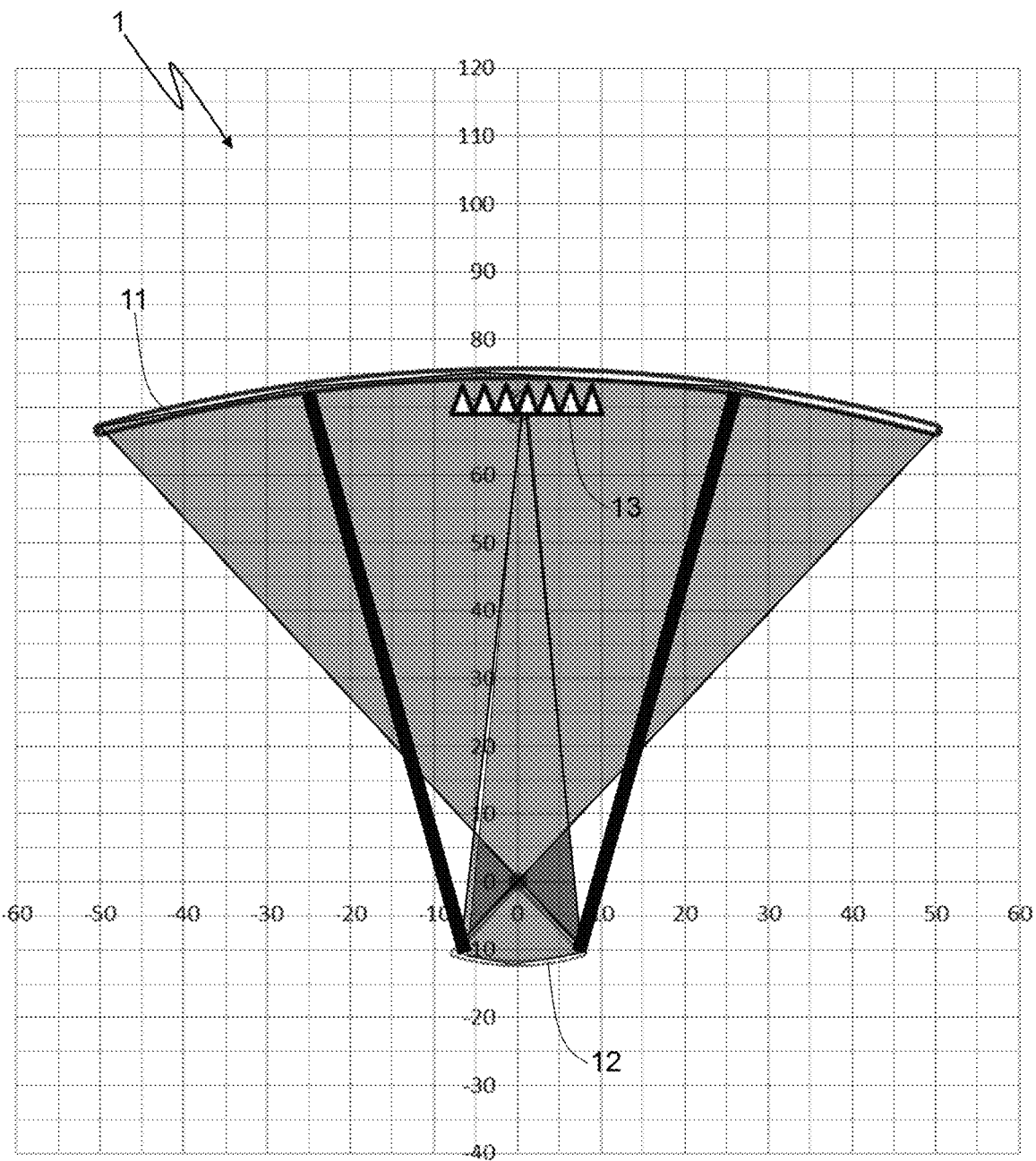
FIG. 2 schematically shows a dual-reflector antenna based on Gregorian geometry.

In this connection, FIG. 2 schematically shows a typical large antenna 1 for communicating with geostationary satellites, which is equipped with a Gregorian dual-reflector optics including a main reflector 11 and a sub-reflector 12, and with a feed array 13 arranged in the focal region of the Gregorian dual-reflector optics.

Large reflector optics behave, with good approximation, as a linear operator, which performs a two-dimensional inverse Fourier transform of the electric field density distribution generated on the aperture by the feed or by the feed array. Similarly, reflectors behave also as a linear operator transforming incident electric field intensity distribution produced by an incident plane wave into an interference pattern on the focal plane, which interference pattern is, in first approximation, the two-dimensional Fourier transform of the electric field distribution thereby representing an image on the focal plane of the far field radiation pattern. This property is schematically represented in FIG. 3 with reference to the large antenna 1.

Reflector's property of producing, on the focal plane, an image of the far field radiated electric field was originally discovered, in optics, by George Airy in the nineteenth century and is called diffraction pattern.

In view of the foregoing, a feed array arranged on the focal plane can be advantageously considered as a way of spatially sampling the diffraction pattern.

Thence, as for TX operation, a feed array can be advantageously considered as a generator of an electric field sampled on the focal plane to obtain the field density distribution on the aperture; instead, as for RX operation, a feed array can be advantageously considered as a sampler of the electric field density produced on the focal plane by a plane wave.

More in detail, in reception, a feed array operates as a spatial sampler of the diffraction pattern on the focal plane that is, with good approximation, a Fourier transform of the electric field produced by the plane wave on the aperture. The electric field density on the focal plane includes aberrations of the integration process: those producing the diffracted field (equivalent to diffraction aberration of a lens) and those depending on errors related to the (main) reflector (i.e., errors due to its assembling and positioning).

As previously explained, the antenna solution adopted by the present invention is called Phased Array Fed Reflector (PAFR) hybrid antenna, and the primary limitation associated with said architecture is electronic scan range, approximately ±10 degrees. Therefore, using PAFR hybrid antennas for LEO applications, the tracking solution is also hybrid, performing an electronics-based fast tracking in combination with a slower tracking based on mechanical rotations. This solution is applicable for LEO constellations for which the antenna has a very limited search angle, being known all the space constellation parameters.

For instance, if the angular separation between two adjacent spots is about ten degrees along the same orbit, varying from twenty to less than five degrees between spots of two adjacent orbits, this corresponds to elevation angles for the ground station varying of about thirty degrees and implies that one single ground station can track from five to ten satellites simultaneously, by suitably controlling the slow mechanical pointing and the fast electronic pointing.

The feed array operates based on electronic shift of the focusing point and, hence, on selective operation of only a subset of radiating elements among the whole available set. In particular, a change in the angle of incidence of the plane wave results in a displacement of the focusing point and, hence, in a shift of the Airy disk on the focal plane.

Again with reference to the large antenna 1, the feed array 13 positioned on the focal plane samples the field distribution on the focal plane. If the plane wave is directed along the focal axis, the phase distribution is close to zero, as a consequence the single traditional feed works in the same way as the array 13, but when the plane wave arrives from a different direction, while the array 13 is capable of intercepting the peak of the power density, the traditional feed is not capable, and a mechanical rotation of the antenna (either at least of the main reflector 11, or the sub-reflector 12) would be necessary.

The Fourier transform generated on the aperture weakly depends on the focal distance except for a scale factor that depends on the equivalent F/D (i.e., focal length to diameter) ratio (including the magnification factor of the sub-reflector). This implies that, to get the same angle with a larger equivalent F/D ratio, a larger displacement is necessary, this is an advantage for the beam accuracy, including a larger number of array elements, but presents the disadvantage of implying a larger array to get the same absolute angular displacement.

A feed array works in a complementary way with respect to a DRA; in fact, while a feed array works redistributing the power on the aperture (leaving to the reflector geometry the duty of steering the beam), a DRA presents an uniform power distribution, changing only the phase pattern of the elements.

Ideally, in order to capture the entire power intercepted by the reflector, it should be necessary to have a primary feed generating a fan beam, which corresponds to interference pattern present on the focal plane. Practically, a feed intercepts only the main lobe pattern, weighting it according to its own pattern on the feed aperture.

The feed array presents a much better situation, due the possibility of improving the interference pattern capture, limiting the spill-over losses.

In fact, all the array elements participates to the generation of the field distribution over the aperture and can generate, using different beam forming networks, a large number of different beams, taking into consideration the limitation of the array physical dimensions.

Figure 4:
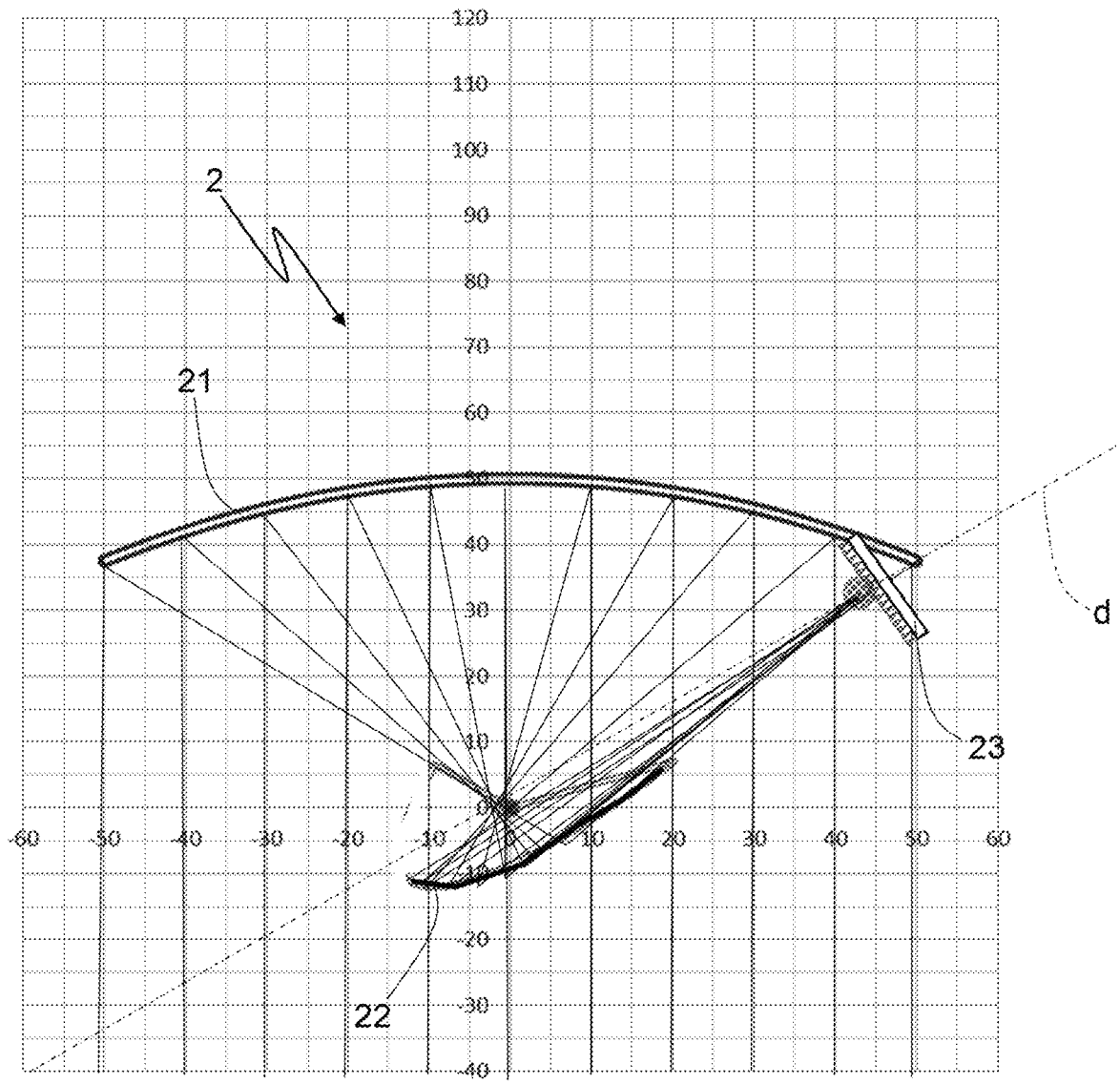
FIG. 4 schematically shows a dual-reflector antenna with an offset feed array configuration.

By optimizing the angular direction of the ellipse axis associated with the sub-reflector, it is possible to arrange the feed array offset from the main reflector axis as shown in FIG. 4 that schematically illustrates a dual-reflector antenna 2 with offset feed array configuration including a main reflector 21, a sub-reflector 22 and an offset feed array 23 (in FIG. 4 the ellipse axis being denoted by d). In this way potential mismatch problems due to double reflection from the sub-reflector 22 into the feed array 23 are avoided.

The advantage of using a feed array architecture has grown considerably with the technology innovation, which has allowed introducing the Software Defined Radio (SDR) in the design of electric circuitry.

What only twenty years ago was difficult to think, due the complexity of RF beam forming network, has become reality due the simplicity of defining beam forming networks at intermediate frequency (IF) and/or in baseband (BB) using either Field Programmable Gate Array (FPGA) or Application-Specific Integrated Circuit (ASIC) technology.

The technology based on FPGA or ASIC allows designing and building functions controlling very accurately the shape of the beam and its behaviour.

The additional advantage is the extremely small dimensions of each beam forming network, allowing to generate with the same radiating array many independent controlled beams.

The push for this dramatic advance in performance has been the introduction of smart antennas in the 3G and 4G cellular networks, introducing the multiple-input and multiple-output (MIMO) technology for improving the performance of the new mobile networks, but their application fields are now well beyond the use for which they have been developed and satellite communication are one of them.

The enormous advantage of the feed array according to the present invention is the possibility of designing the beam forming network at a very low frequency, taking the full advantage of the SDR approach.

In this way, it is possible to manage different beams with one and the same RF layer, to scan at high speed an angular sector of about ten beam widths. Therefore, the antenna is very versatile and offers the possibility of having many virtual antennas with only one infrastructure.

Figure 5:
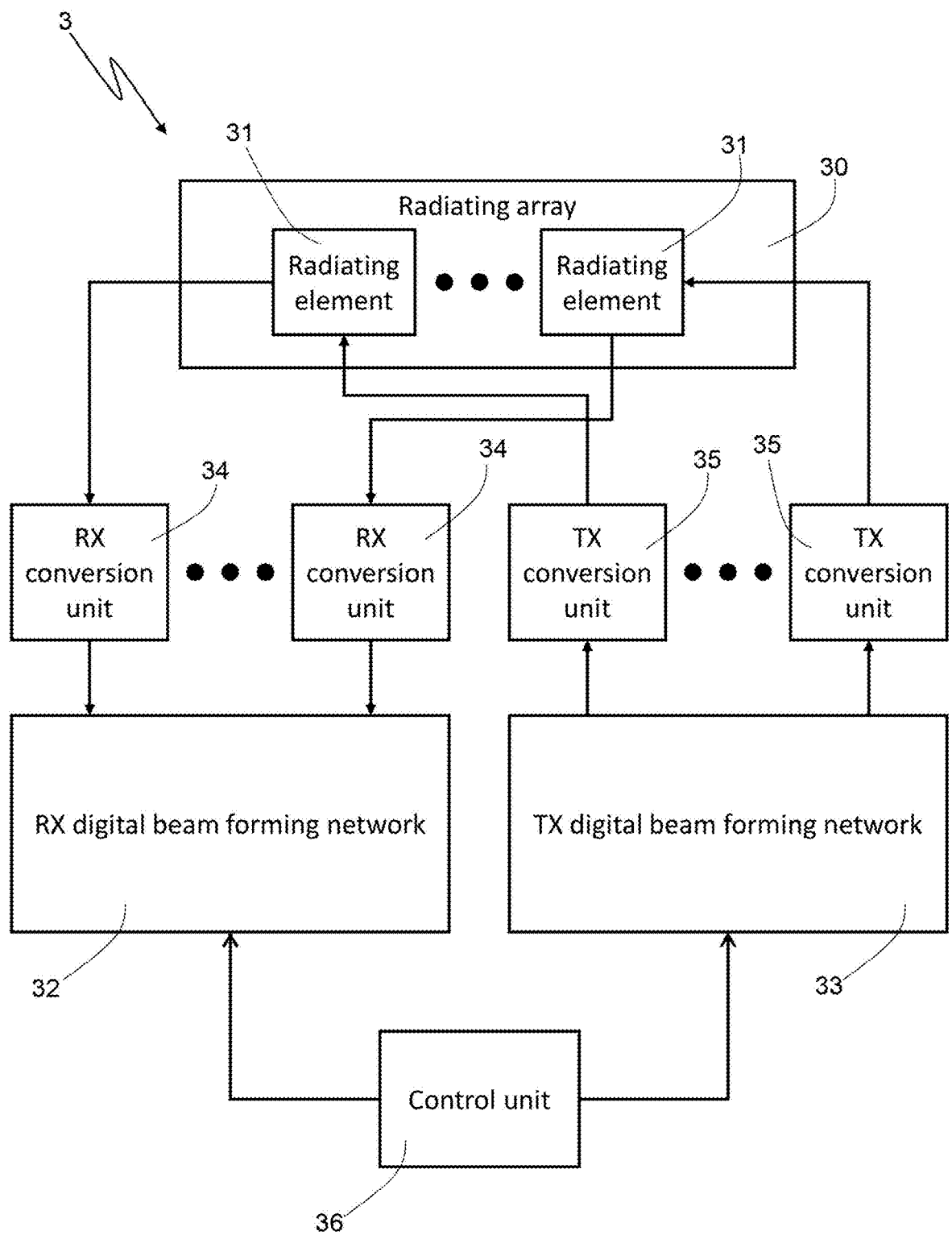
FIG. 5 schematically illustrates a functional architecture of a feed array according to a preferred embodiment of the present invention.

In this respect, FIG. 5 schematically illustrates (in particular, by means of a block diagram) a functional architecture of a feed array (denoted as a whole by 3) according to a preferred embodiment of the present invention.

In particular, as shown in FIG. 5, the feed array 3 includes:
- a radiating array 30 that includes radiating elements 31 operable to transmit and receive RF signals (conveniently, microwave signals);
- an RX digital beam forming network 32 (preferably, based on FPGA and/or ASIC technology/ies);
- a TX digital beam forming network 33 (preferably, based on FPGA and/or ASIC technology/ies);
- for each radiating element 31,
    - a respective RX conversion unit 34, which is connected between said radiating element 31 and the RX digital beam forming network 32 and is designed to apply a frequency down-conversion and an analog-to-digital conversion to incoming RF signals received by said radiating element 31, thereby obtaining corresponding incoming digital signals provided by said RX conversion unit 34 to the RX digital beam forming network 32, and
    - a respective TX conversion unit 35, which is connected between said radiating element 31 and the TX digital beam forming network 33 and is designed to apply a digital-to-analog conversion and a frequency up-conversion to outgoing digital signals generated by the TX digital beam forming network 33, thereby obtaining corresponding outgoing RF signals provided by said TX conversion unit 35 to said radiating element 31 to be transmitted thereby; and
- a control unit 36 configured to control operation of the RX and TX digital beam forming networks 32 and 33; in particular, configured to cause said RX and TX digital beam forming networks 32 and 33 to generate predefined beams in reception and transmission, respectively.

Preferably, each RX conversion unit 34 is designed to perform also a low noise amplification of the incoming RF signals before applying the frequency down-conversion and the analog-to-digital conversion. Conveniently, the frequency down-conversion may include successive down-conversions at different IFs, thereby bringing frequency from RF up to BB.

Similarly, each TX conversion unit 34 is preferably designed to perform also a high power amplification of the outgoing RF signals after the digital-to-analog conversion and the frequency up-conversion. Conveniently, the frequency up-conversion may include successive up-conversions at different IFs, thereby bringing frequency from BB up to RF.

Conveniently, the radiating array 30 may include two distinct sets of radiating elements 31 (e.g., patch antennas), a first one operable in transmission and a second one operable in reception; alternatively, the radiating array 30 may include a single set of radiating elements 31 operable for both transmission and reception.

Preferably, the RX digital beam forming network 32 is embodied by means of one or more FPGA units and/or one or more ASIC units.

Conveniently, the feed array 3 may include a plurality of RX digital beam forming networks 32, each embodied by means of a respective FPGA or ASIC unit and connected to all the radiating elements 31 (i.e., the receiving ones) or to a respective subset thereof.

Similarly, also the TX digital beam forming network 33 is preferably embodied by means of one or more FPGA units and/or one or more ASIC units.

Conveniently, the feed array 3 may include also a plurality of TX digital beam forming networks 33, each embodied by means of a respective FPGA or ASIC unit and connected to all the radiating elements 31 (i.e., the transmitting ones) or to a respective subset thereof.

Preferably, electronic pointing of a reflector antenna equipped with the feed array 3 is implemented via the RX and TX digital beam forming networks 32 and 33, is controlled by the control unit 36 and is coordinated with mechanical pointing of the antenna. For example, the control unit 36 may be conveniently interfaced to a main or central control unit (not shown in FIG. 5) of the reflector antenna, wherein said main/central control unit is in charge of controlling both electronic and mechanical pointings and, hence, is configured to control operation of:

the control unit 36 of the feed array 3; and
a mechanical pointing system (not shown in FIG. 5) of the reflector antenna (in particular, a control unit of said mechanical pointing system).

Alternatively, the control unit 36 may conveniently operate as the main/central control unit and, hence, can be directly interfaced to the control unit of the mechanical pointing system of the reflector antenna to control operation thereof.

Operations performed by the feed array 3 and, more specifically, functions carried out by the RX and TX digital beam forming networks 32 and 33 and by the control unit 36 will be described in detail hereinafter.

In particular, in the following paragraphs a completely new approach will be described, which allows pushing the use of the feed array and reflector antenna technology well beyond the current capabilities.

3. Innovative Application of Feed Array

Figure 6:
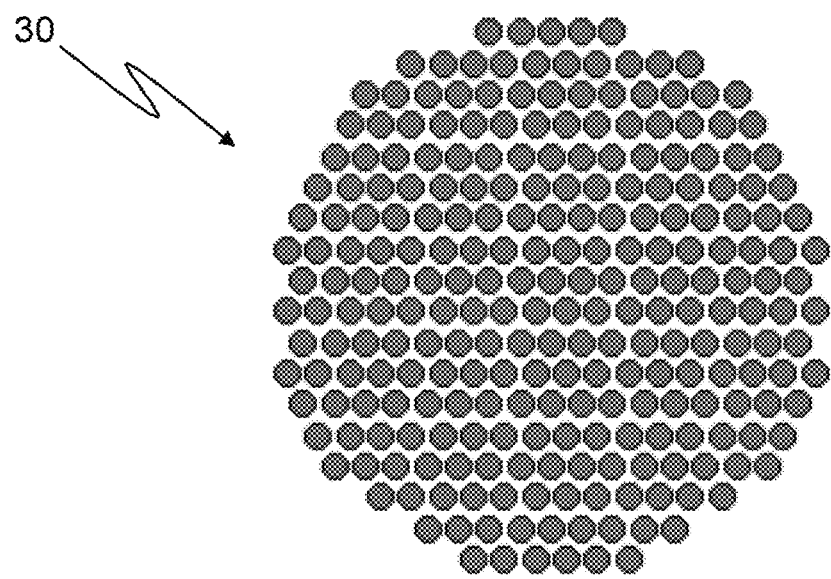
FIGS. 6 and 7 show two different geometries for a radiating array of the feed array of FIG. 5.
Figure 7:
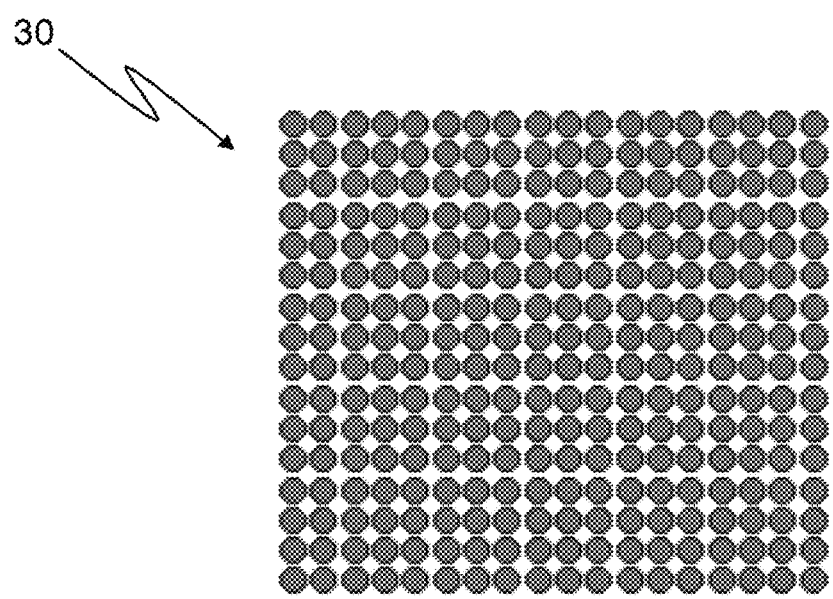

As previously explained, the feed array 3 is much more than a way of pointing the beam; in fact, it can be considered as a way of sampling the focal plane, with a number of degrees of freedom depending on the number of radiating elements 31. In this connection, reference can be made to FIGS. 6 and 7 showing two different geometries for the radiating array 30, in particular a circular substantially-planar array with triangular grid and a uniform rectangular array (URA).

The feed array 3 can be advantageously used to provide antenna pointing and also to compensate for main reflector's surface distortions.

In particular, the feed array 3 represents a solution for reusing existing reflector antennas (also those designed to operate at lower or, anyway, different frequencies (e.g., in Ku and/or C band) than those used by LEO satellites), compensating for reflectors' surface errors of said existing reflector antennas by using the available degrees of freedom of said feed array 3.

Thence, also a very large antenna that nowadays represents an obsolete solution may be fully recovered to obtain up to forty different beams, compensating all the surface errors of the old reflector.

Figure 8:
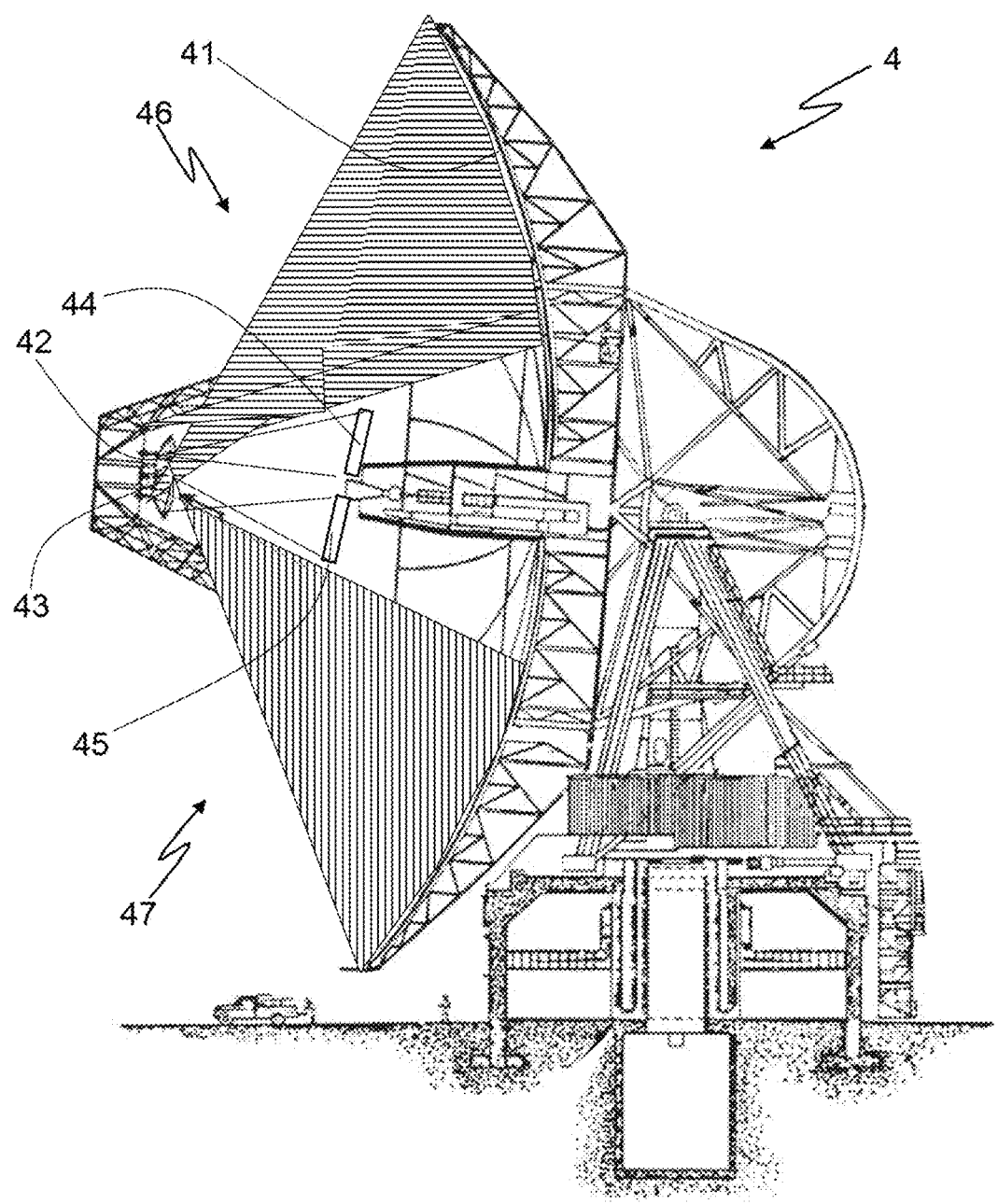
FIGS. 8 and 9 schematically illustrate two examples of dual-reflector antenna according to two illustrative embodiments of the present invention.
Figure 9:
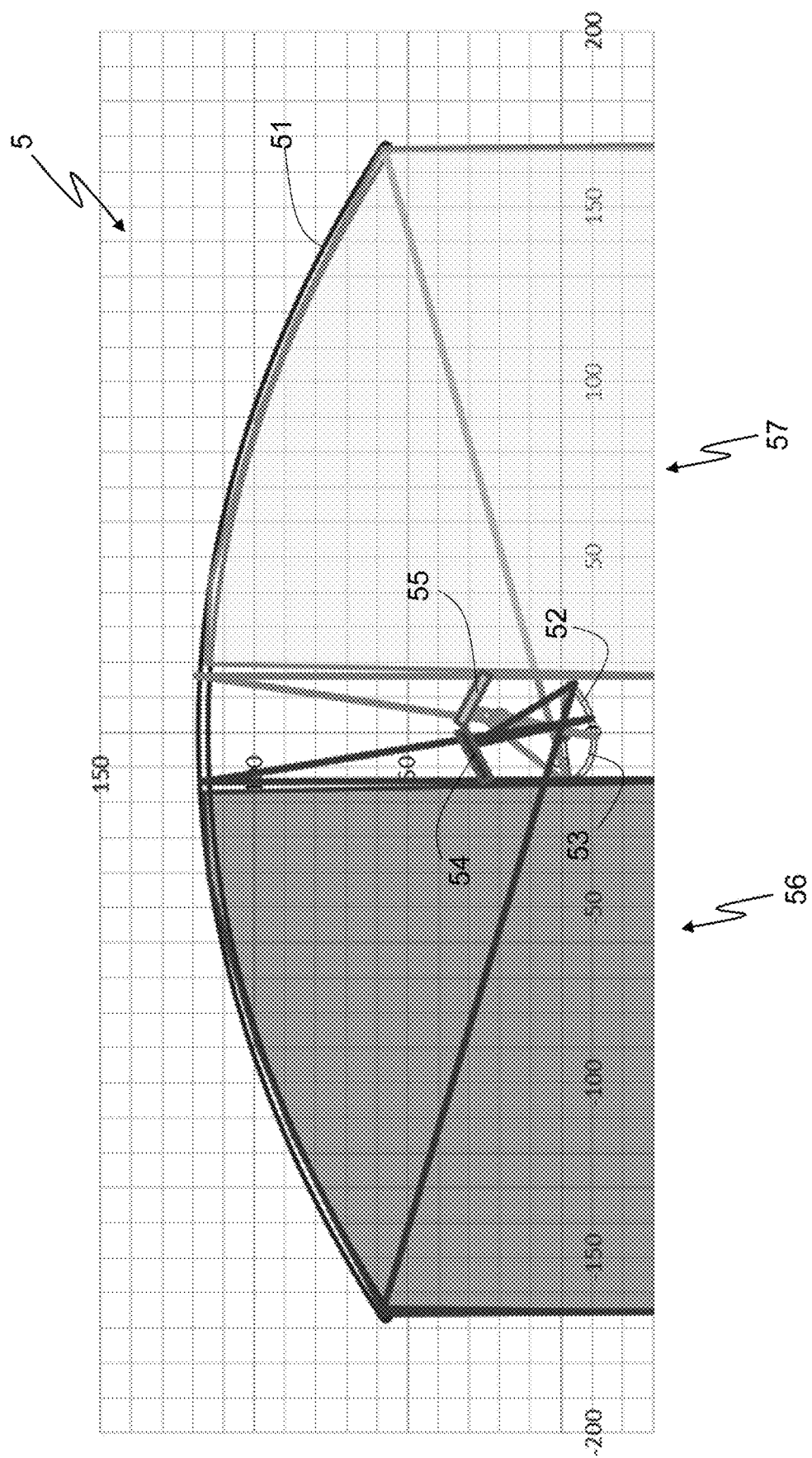

In this connection, reference can be made to FIGS. 8 and 9 that schematically illustrate two examples of dual-reflector antenna according to two illustrative embodiments of the present invention.

In particular, FIGS. 8 and 9 shows an antenna 4 and an antenna 5, respectively, which could be existing large antennas fitted with a dual-reflector optics and originally designed to operate in Ku or C band.

In detail, said antennas 4 and 5 comprise each:
a respective main reflector 41/51 (that is the original main reflector of the original dual-reflector optics);
two respective sub-reflectors 42,43/52,53 (provided in place of the original sub-reflector of the original dual-reflector optics and conveniently based on a multiple Gregorian offset configuration); and
two respective feed arrays 44,45/54,55 (preferably, designed as the feed array 3 shown in FIG. 5 and previously described).

More specifically, for each antenna 4/5, the two respective sub-reflectors 42,43/52,53 can be made as different portions of a single sub-reflector structure or as two distinct structures, and comprise a respective first sub-reflector 42/52 and a respective second sub-reflector 43/53. Moreover, for each antenna 4/5, the two respective feed arrays 44,45/54,55 include, in turn, a respective first feed array 44/54 and a respective second feed array 45/55, wherein:

the first sub-reflector 42/52 and the first feed array 44/54 are arranged with respect to each other so as to form, along with a corresponding first portion of the main reflector 41/51, a first dual-reflector antenna sub-system 46/56; and
the second sub-reflector 43/53 and the second feed array 45/55 are arranged with respect to each other so as to form, along with a corresponding second portion of the main reflector 41/51 (said second portion of the main reflector 41/51 being distinct from said first portion), a second dual-reflector antenna sub-system distinct from the first dual-reflector antenna sub-system 47/57.

Therefore, in order to obtain the antennas 4 and 5 and, hence, the two respective distinct dual-reflector antenna sub-systems 46,47 and 56,57, it is possible to reuse an existing large antenna, in particular its main reflector, its support structure (e.g., the pedestal) and its mechanical steering system, while two (or even more) pairs of new sub-reflector/feed-array are installed so as to make two (or even more) double-reflector antenna sub-systems, each designed to operate:

in a respective RF band (in particular, a respective microwave band) that can be different than the operating band of the original large antenna; and in a respective direction range.

In particular, as for antenna pointing, the original mechanical steering system of the existing large antenna can be used to perform the aforesaid slow, coarse pointing based on mechanical steering of the antennas 4 and 5. Moreover, for each dual-reflector antenna sub-system 46,47,56,57, a respective specific fine pointing can be performed by electronically controlling operation of (i.e., by electronically steering) the respective feed array 44,45,54,56.

In this way, it is possible to make, via a single existing large antenna, a plurality of multiple-beam dual-reflector antenna sub-systems operable at RFs different from those for which the existing large antenna was originally designed.

In this connection, it is worth noting that, in order to obtain different dual-reflector antenna sub-systems from a single dual-reflector antenna, it is possible to exploit two or more feed arrays in combination with distinct or even partially overlapping portions of the main reflector and/or of the sub-reflector.

4. Feed Array Used to Compensate for Reflector's Surface Error

Figure 10:
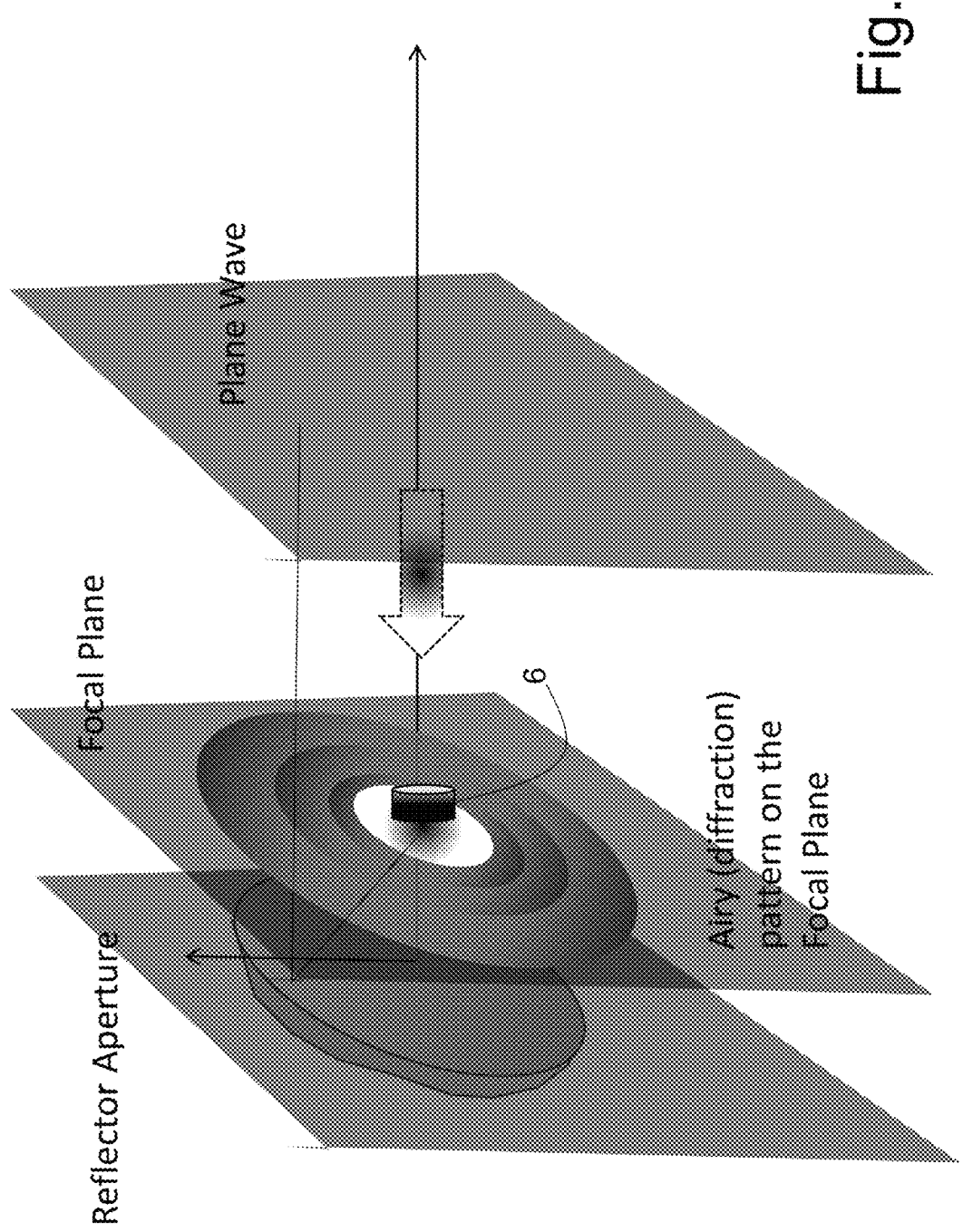
FIGS. 10 and 11 show relation between far field and electrical field distribution on the focal plane of a reflector antenna.
Figure 11:
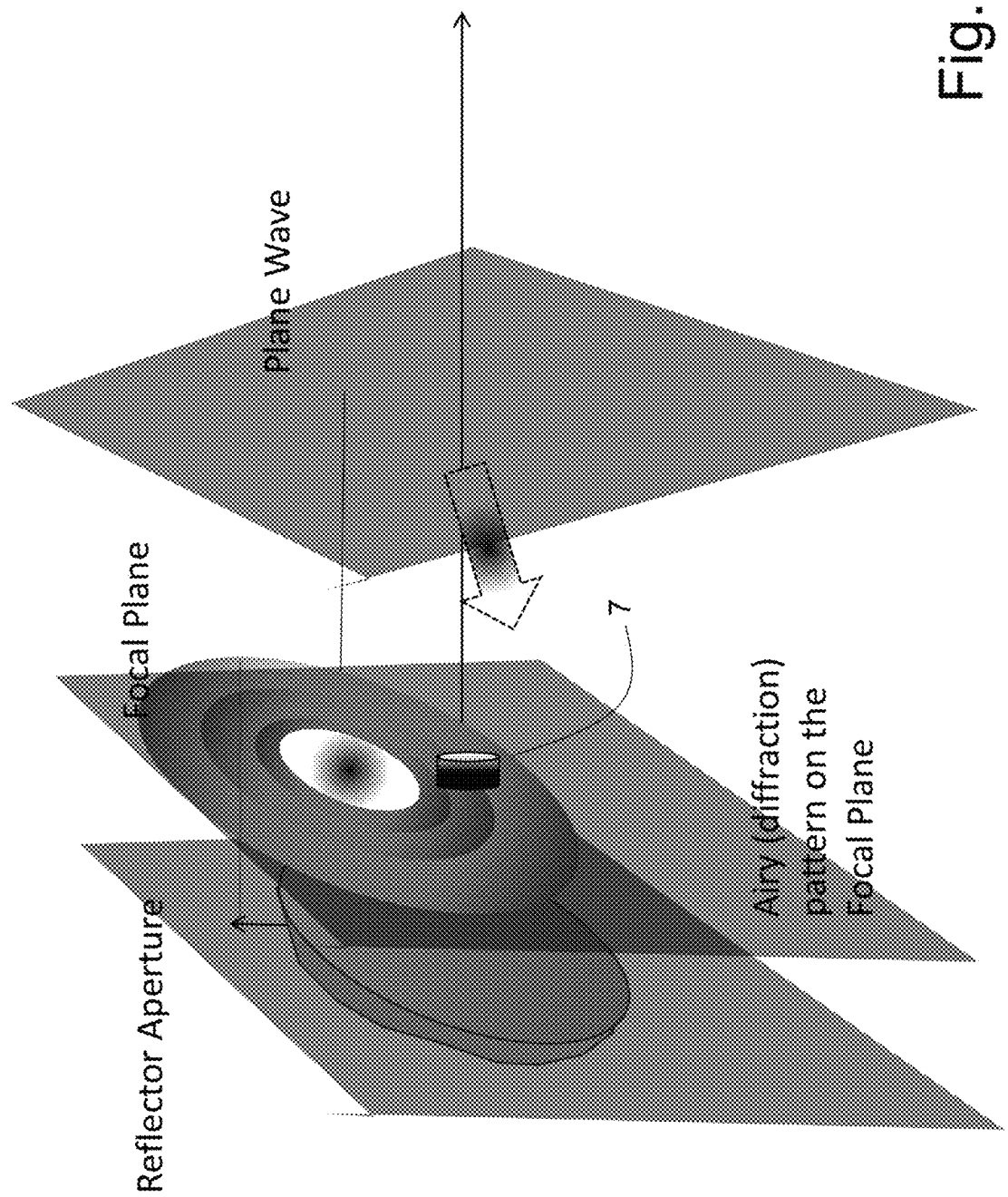

The feed array can intercept on the focal plane the electric field distribution caused by the surface errors and compensate for them by using a filtering function reproducing the complex conjugate distribution of the electric field intercepted on the focal plane by the feed array. The incoming field on the reflector is, in first approximation, a plane wave characterised by a phase front depending on the arrival direction. The reflector "performs" a two-dimensional Fourier transform between the electrical field distribution on the aperture and the far field pattern and, similarly, the reflector "performs" a similar Fourier transform between the aperture and the focal plane. This is the way in which the feed array takes into account the direction of the plane wave, namely by creating a peak (Airy disk) on the focal plane positioned according to the direction of arrival. In this connection, reference can be made to FIGS. 10 and 11 showing relation between far field and electrical field distribution on the focal plane (in particular, showing that the peak position of the Airy (diffraction) pattern on the focal plane is related to the direction of arrival of the plane wave—in FIGS. 10 and 11, numerals 6 and 7 respectively denoting centres of feed arrays arranged on the focal plane).

The reflector introduces errors depending on manufacturing and assembly tolerances and these errors present a deviation on the aperture from the plane wave behaviour, such as polynomial phase errors, oscillating errors, random errors.

The feed array can take the duty not only of matching the incoming direction of the plane wave in the designed angular window, but also of correcting, up to a minimum, the distortion effects due to the reflector assembly and manufacturing tolerances up to the limit depending on the freedom degrees of the feed array itself.

In other words, Applicant's idea is that of using the field distribution on the focal plane to compensate for tolerance errors using a feed array. This is particularly advantageous for high-dynamics targets such as LEO satellites.

The following is a non-exhaustive list of reasons for which the present invention is new and inventive with respect to U.S. Pat. No. 4,586,051 A and the paper by F. Centureli et al. entitled "Feed Array Metrology and Correction Layer for Large Antenna Systems in ASIC Mixed Signal Technology":

the present invention enables reusing existing antennas (formerly used at lower frequencies) with the innovative possibility of using the same main reflector for creating more antennas;

the present invention provides for a combination of electronic and mechanical steering of the various beams of the new antenna system to follow the high-dynamics LEO satellites without stressing the existing antenna mechanics;

the present invention allows determining and optimizing the coefficients of the feed array both in transmission and reception to get in real time, according to the satellite motion, the evaluation and the compensation of the reflector tolerances;

the present invention provides for a fully automatic procedure to verify the antenna system performance during its life cycle to optimize costs and time of preventive maintenance.

Let's consider the field on the focal plane, it is in first approximation the inverse Fourier transform of the aperture:

$$E_{Focal\ Plane}(\xi, \eta) \approx \int_{Aperture} A(x, y)e^{j2\pi\left(\frac{\xi}{F\lambda}x+\frac{\eta}{F\lambda}y\right)}dxdy,$$

where x, y denote the domain coordinates on the aperture, $\xi$, $\eta$ denote the codomain coordinates on the focal plane, and F denotes the focal length.

The field can be sampled on the aperture plane with a step between 0.7 and 1λ (wavelength). This sampling corresponds to the geometrical positions of the feed array elements.

The former equation can be processed in the following way:

$$E_{Focal\ Plane}(k, j) \approx \int_{Aperture} A(x, y)e^{j2\pi\left(akd\frac{1}{F}x+ajd\frac{1}{F}y\right)}dxdy,$$

where k, j denote indexes of the codomain coordinates on the focal plane, α denotes the ratio between the element spacing and λ.

5. Feed Array's RX Matrix

The feed array can operate based on a RX matrix used in reception and a TX matrix used in transmission, wherein said RX and TX matrices represent the weighting factors of the electrical field samples on the focal plane for reception and transmission, respectively.

In general, a distorted reflector cannot, in general, focalize the power in a small area around the focus, therefore the reflector needs a tailored design of the weights on the RX path to collect the power with the correct phase, while on the TX path the field distribution on the focal plane shall take into account the effects of the reflector distortions. Additionally, while in reception the field can be corrected without additional hypotheses on the reflector errors, in transmission the field shall be generated on the focal plane, assuming an estimation of the reflector distortions to be compensated.

The RX matrix and the TX matrix are, thence, defined to obtain the result of a full compensation (within the limits of the array dimensions) for both the TX and the RX sections independently.

In particular, the RX matrix is conveniently defined on the basis of two matrices, a first one for beam pointing in reception and a second one for error correction in reception, in particular for correcting errors due to reflector.

The same applies to TX matrix that can be conveniently defined on the basis of two respective matrices, a first one for beam pointing in transmission and a second one for taking into account reflector-related errors in transmission.

Figure 12:
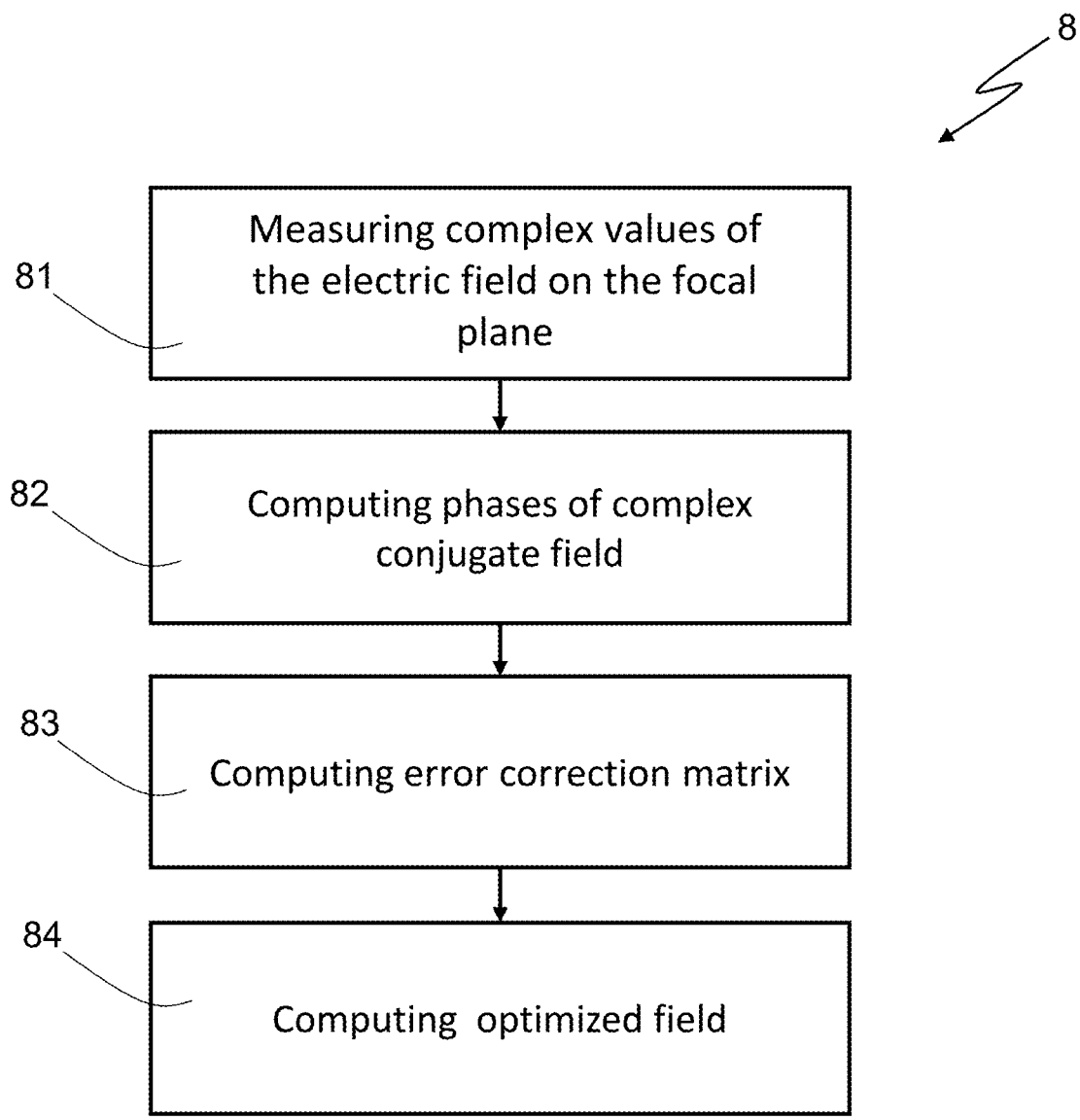
FIG. 12 schematically illustrates a procedure for computing an error correction matrix to be used in reception according to an embodiment of the present invention.

As for operation in reception, FIG. 12 schematically illustrates steps performed by the feed array to compute an error correction matrix and, then, to compensate for reflector's errors.

In particular, as shown in FIG. 12, the procedure (denoted as a whole by 8) implemented by the feed array includes:
measuring complex values of the electric field on the focal plane (block 81);
computing phases of complex conjugate field (block 82);
computing an error correction matrix on the basis of the phases of complex conjugate field (block 83); and
computing optimized field (block 84).

In detail, as for block 81 in FIG. 12, the electric field generated on the focal plane can be sampled:

$$E_{Aperture}(x, y) \xrightarrow[\substack{\text{From the Field on the} \\ \text{Aperture the Matrix of the} \\ \text{Sampled elements}}]{} [E_{FP}(k, j)].$$

As for block 82 in FIG. 12, a weighting matrix can be defined as:

$$[V_{k,j}] = [e^{-j\phi_{k,j}}]; \text{ where } \phi_{k,j} = \tan^{-1}\left(\frac{-\text{Im}(E_{FP}(k, j))}{\text{Re}(E_{FP}(k, j))}\right).$$

Then, the error correction matrix is defined as (block 83 in FIG. 12):

$$[W_{k,j}] = [[V_{k,j}]]^T.$$

The error correction matrix $[W_{k,j}]$ can be conveniently determined assuming an arbitrary value for the phase of one element assumed as a reference (for instance the central one of the feed array).

Then, let's consider the matrix resulting from the product:

$$[A_{k,j}] = [E_{FP}(k,j)][W_{k,j}].$$

Let's consider the first column of the matrix $[A_{k,j}]$ $$A_{k,1} = \Sigma E_{FP}(k,1) W_{k,1},$$

and consider the optimized field A defined as (block 84 in FIG. 12):

$$A = \Sigma A_{k,1} = \Sigma\Sigma E_{FP}(k,1) W_{k,1} W_{k,1}.$$

6. Feed Array Dimensions and Degrees of Freedom

The array elements involved in the compensation technique are, in practical terms, not all. The active elements should be positioned around the nominal elements involved in the fast pointing, assuming the reflector surface without errors, according to the position of the nominal Airy disk.

Introducing the reflector tolerance and assembly errors the element number grows mainly according to the correlation products of the errors on the surface and then with the residual sum of squares (RSS) of the errors.

In case of reflector de-focalization, which corresponds to a systematic quadratic error on the aperture, the element number to be considered is related to the inclusion of the position of the first side lobe of the interference pattern on the focal plane, almost independently of the focalization to be recovered.

Using a number of elements including the first diffraction secondary lobe on the focal plane, the compensation can be considered non depending on the feed array dimensions. The first secondary lobe intercepts, indeed, most of the spread power.

Figure 13:
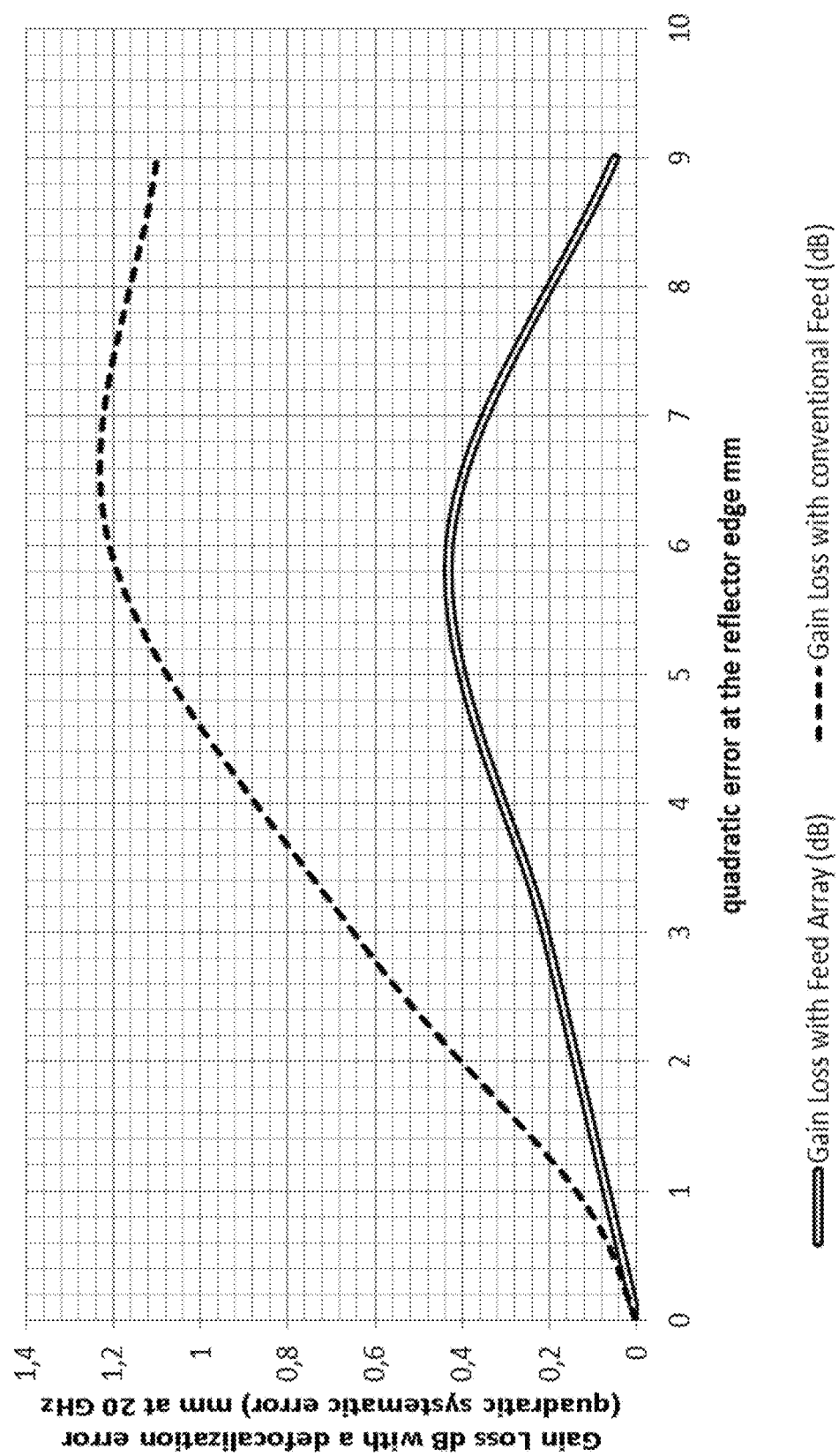
FIG. 13 shows gain loss behavior using a feed array and conventional feed for de-focalization errors.

In this connection, FIG. 13 shows gain loss behavior using a feed array and a conventional feed for de-focalization errors.

The situation is rather different for random errors. In this case, a correlation length is introduced, in order to consider that the reflector surface shows, in general, strong correlation between close points, due to the manufacturing and structural characteristics of the reflector surface and its assembly on the mechanical infrastructure.

The degree of freedom of the antenna reflector depends on the random error and, in particular, on the correlation parameter.

The power spread on the focal plane is mainly sensitive to the correlation parameter and then to the RSS value.

Figure 14:
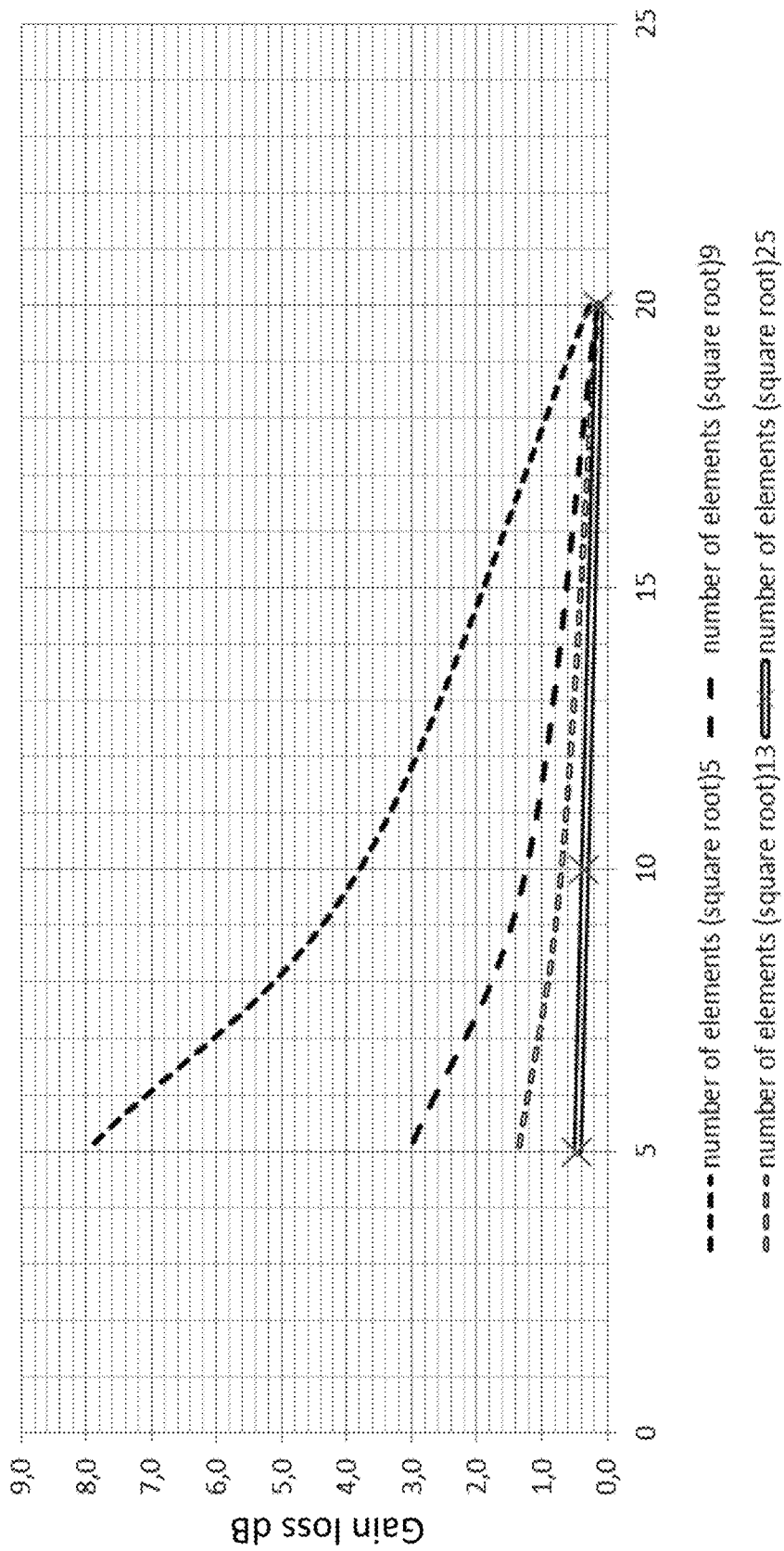
FIG. 14 shows gain loss behavior for random errors.

FIG. 14 shows performance synthesis. In particular, from FIG. 14 it is evident that using twenty five sampling points for each dimension on the focal plane (corresponding to 600 degrees of freedom in defining the reflector errors), the results are very good and the compensation is very strong. This implies the capability of the feed array to operate with strongly distorted antenna reflectors in terms of RSS.

Therefore, practical design conveniently takes into account the status of the antenna reflector to be used and then the active area of each position of the feed array can be determined in order to implement the FPGA design.

7. Thermal Noise of the Antenna with Feed Array

Figure 15:
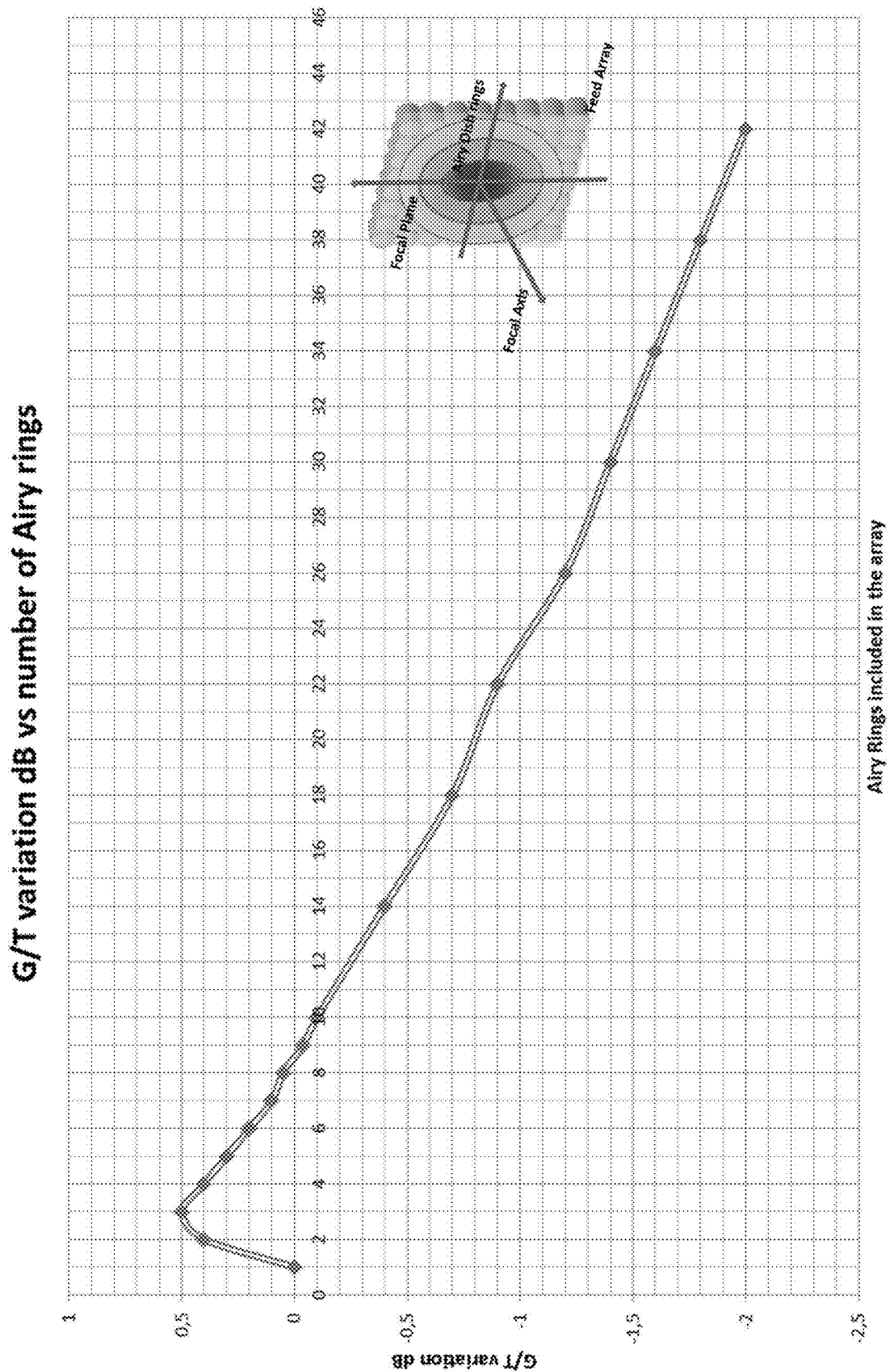
FIG. 15 shows signal-to-noise ratio variation due to the number of Airy rings included in the operation of a feed array.

The presence of the feed array, using the FPGA/ASIC technology, conveniently implies the presence of a low-noise amplifier (LNA), or a low-noise converter (LNC), for each radiating element of the feed array. It is important to state the impact on the overall signal to noise ratio (S/N) of the antenna in such a configuration. The noise contribution slightly increases with the number of Airy rings included in the operation of the feed array, while the optimized contribution of the field improves for the first few rings and then decreases slowly, as shown in FIG. 15. The noise impact varies very little introducing the feed array, with a small advantage using few elements and with an overall loss lesser than 0.5 dB introducing up to 13 elements for each semi axis (with a total of more than 700 elements).

8. Feed Array's TX Matrix

In reception, the feed array does not need any external information to optimize the focal plane weighting coefficients. The reason for this feature is a consequence of the knowledge of the incoming plane wave that is recovered without phase errors. In first approximation, on the focal plane the diffraction pattern is the result of the two-dimensional inverse Fourier transform of the aperture field that is known, being a plane wave with a known incident angle. Therefore, in reception the coefficients of the weighting matrix (i.e., the aforesaid error correction matrix) are evaluated to reconstruct the incoming plane wave phase front, compensating for the phase errors due to reflector tolerance and assembly errors.

In order to generate the best coefficients for the TX matrix (in particular, for the reflector-error-related matrix to be used in transmission), it is necessary to evaluate the geometrical distortions of the reflector surface and, hence, it is useful to perform an estimation starting from the knowledge of the RX coefficients.

The focal plane RX electric field is given by:

$$E_{FPrx}(k,j) \approx \int_{Aperture} A(x,y) e^{j\phi(x,y)} e^{j2\pi(\alpha k d \frac{1}{F} x + \alpha j d \frac{1}{F} y)} dx dy.$$

On the aperture the field can be sampled to get the same number of samples used on the focal plane:

$$E_{FPrx}(k,j) \approx \sum_n \sum_m A\left(m\frac{a}{\lambda}, n\frac{a}{\lambda}\right) e^{j\phi_{m,n}} e^{j2\pi(\alpha k d \frac{a}{F} m + \alpha j d \frac{a}{F} n)},$$

$$A\left(m\frac{a}{\lambda}, n\frac{a}{\lambda}\right) e^{j\phi_{m,n}} = \sum_k \sum_j E_{FPrx}(k,j) e^{-j2\pi(\alpha k d \frac{a}{F} m + \alpha j d \frac{a}{F} n)}.$$

Then, assuming $$A\left(m\frac{a}{\lambda}, n\frac{a}{\lambda}\right) = \text{constant (plane wave)}$$

there results:

$$e^{j\phi_{m,n}} = \sum_k \sum_j E_{FPrx}(k,j) e^{-j2\pi(\alpha k d \frac{a}{F} m + \alpha j d \frac{a}{F} n)}.$$

The matrix $[e^{j\phi_{m,n}}]$ represents the error distribution on the aperture plane at the RX frequency.

Then, considering the ratio between the RX and TX frequencies $$\beta = \frac{\lambda_{rx}}{\lambda_{tx}},$$

it is possible to get the aperture distortion function for the TX frequency:

$$[e^{j\beta\phi_{m,n}}].$$

From the distortion distribution matrix it is possible to derive the illumination function of the focal plane for the feed array:

$$E_{FPtx}(k,j) \approx \sum_n \sum_m A\left(m\frac{a}{\lambda_{tx}}, n\frac{a}{\lambda_{tx}}\right) e^{j\beta\phi_{m,n}} e^{j2\pi(\alpha k \beta d \frac{a}{F} m + \alpha j \beta d \frac{a}{F} n)}$$

and, finally, the full TX reflector-error-related matrix on the focal plane $$[E_{FPtx}(k,j)].$$

Figure 16:
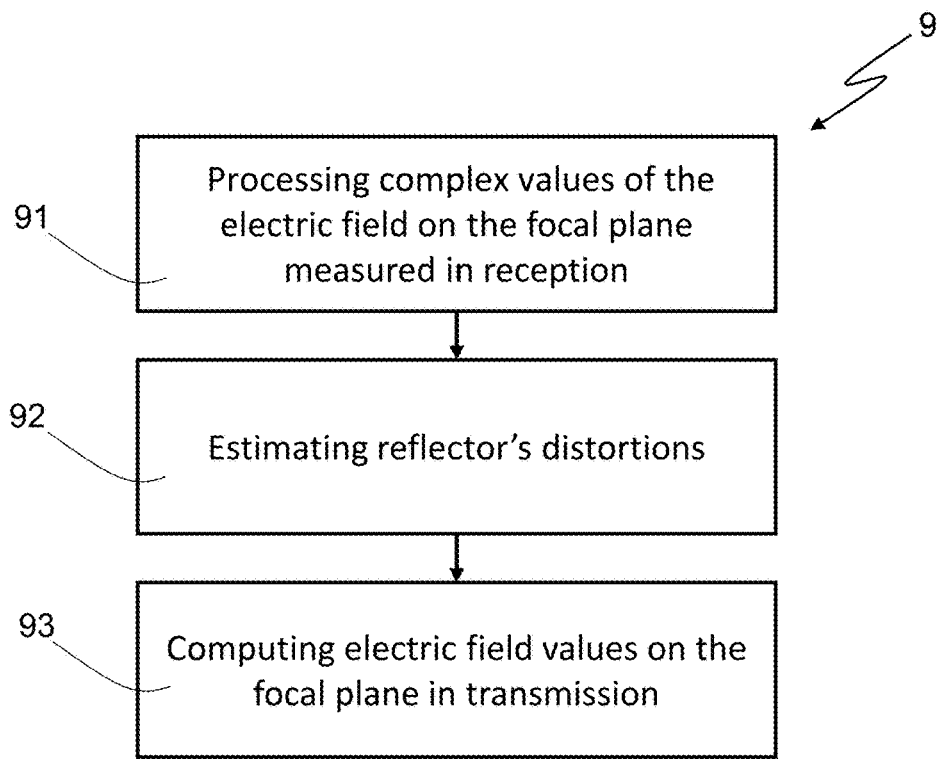
FIG. 16 schematically illustrates a procedure for computing a reflector-error-related matrix to be used in transmission according to an embodiment of the present invention.

In order to summarize the steps performed by the feed array to compute the TX reflector-error-related matrix (i.e., the matrix that takes into account reflector-related errors in transmission and that, as previously explained in paragraph 5, defines the overall TX matrix along with a beam pointing matrix related to beam pointing in transmission), reference can be made to FIG. 16 that schematically illustrates the procedure just described.

In particular, as shown in FIG. 16, the procedure (denoted as a whole by 9) implemented by the feed array includes:
  processing complex values of the electric field on the focal plane measured in reception (conveniently, by performing an inverse Fourier transform)—block 91;
  estimating reflector's distortions (in particular, reflector-related phase shifts)—block 92; and
  computing electric field values on the focal plane in transmission on the basis of the reflector-related phase shifts estimated—block 93.

9. Verification of Antenna Performance

In view of the foregoing, the reflector antenna according to the present invention is capable of compensating for reflector distortions and allows reusing existing antenna infrastructures (originally designed for other frequency bands). Additionally, the reflector antenna according to the present invention offers also the possibility of a fast verification of its condition, avoiding heavy and costly measurement campaign for maintenance purposes.

Figure 17:
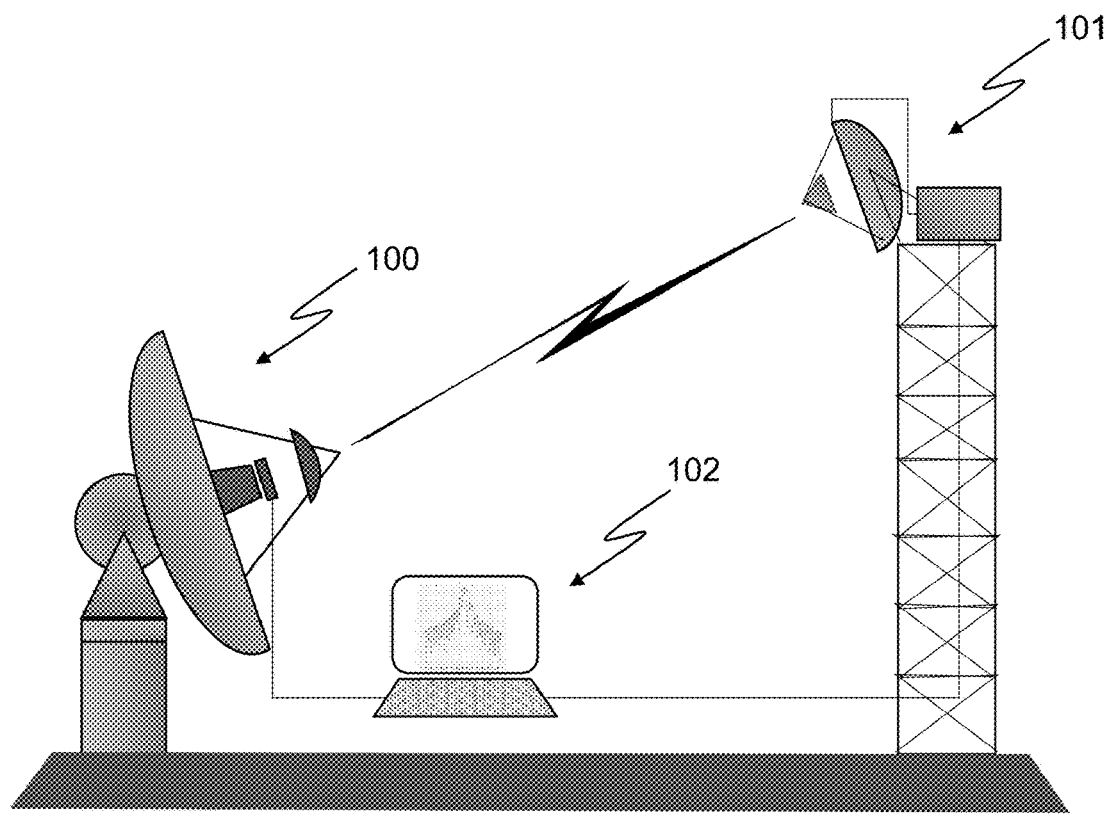
FIG. 17 shows an example of architecture for verifying an antenna according to an illustrative embodiment of the the present invention.

In fact, the RX section of the reflector antenna can be advantageously used to measure, in one shot, the antenna pattern on the focal plane by means of the feed array. If the memorized corrections (i.e., reference pattern) do not correspond to the measured distortions (i.e., measured pattern), the RX section is capable of outlining pattern differences. In order to perform the full pattern measurement it is necessary only to point the antenna at a beacon located at a known position. In this respect, reference can be made to FIG. 17 that shows a reflector antenna 100 according to the present invention that receives RF signals from a beacon 101. Moreover, FIG. 17 shows also a processor 102 connected to both the reflector antenna 100 and the beacon 101 to control the measurement and to check any difference between the reference pattern associated with the reflector antenna 100 and the pattern measured by said reflector antenna 100.

10. Feed Array Dimensioning

As explained in the foregoing, the electric field on the focal plane is either generated (TX section) or intercepted (RX section) by an array of feed apertures.

It is interesting to note how the feed dimensions impact on the reflector illumination and how they are related to the capability of recovering reflector errors.

A feed element integrates the field contribution on its aperture with two main effects: the former is a decrease of the available degrees of freedom, the latter is the appearance of grating lobes from the overall feed array pattern when the feed dimensions grow in terms of wavelength.

The sampling on the focal plane can be considered as a sequence of step functions representing the feed elements. In reality, the function should not be a step, but a sort of half period cosine function, but this is not important for the effects of the focal plane field quantization and the impact on the degrees of freedom of the feed array structure.

The presence of grating lobes can be worse in the case of beam steering, due to the larger phase contribution to point the beam, therefore the limits for the feed array element size should be, in general, lesser than λ.

It is worth noting that the size of the feed element introduces (as is known) an additional taper of the feed amplitude at the reflector edge; this effect slightly decreases the aperture efficiency, but does not cause additional distortions, whereas, when the size overcomes λ, the effects of the grating lobes start being evident.

If the feed element size increases, it starts to be evident the decrease of degrees of freedom, due to the fact that only one or two feed elements are active, and the pattern is very sensitive to the type of distortions to be recovered.

11. Degrees of Freedom Vs Feed Array Sizing

The field distribution on the focal plane depends on F/D ratio and the grating lobes depend on the sampling in terms of wavelength λ. Therefore, the degrees of freedom depend on the dimensions of the feed array as:

$$\text{degrees of freedom} \leq 2k(2k+1)\lambda^2 / \left(\frac{Fd}{D\lambda}\right)^2,$$

where $(2k+1)\lambda$ is the size of the feed array, F/D is the focal length to diameter ratio, and d is the feed diameter.

Instead, the presence of grating lobes depends on d/λ.

The increase of F/D ratio has a positive effect on the field shape on the reflector if the spill-over power generated by the feed array is acceptable, due to the possible presence of grating lobes, when the feed element is larger than 1.25λ. On the contrary, the situation becomes critical when F/D ratio is smaller than one.

In order to reach a good compromise among the complexity of the feed array, the presence of grating lobes and the possibility of using in a simple way the same elements for both transmission and reception sections, a F/D ratio between 1.5 and 2 may be advantageously used.

For a typical application with an antenna of about 11 m diameter, it is possible to consider four antennas of about 5 m diameter with an equivalent F/D ratio of about 2, corresponding to a F/D ratio of about 1 for the full size reflector.

12. Edge Tapering

In a conventional reflector system, the use of a single feed implies a trade-off among "spill-over", efficiency and side-lobe level. The feed size is, thence, the key element (in connection with the F/D ratio) for managing these three conflicting parameters.

With a feed array the situation is rather different. The feed array acts as a special filter, which is responsible not only for correcting the reflector errors, but it can be also used to define an additional weighting function to optimize the side lobe level of the reflector antenna. It is important to note that this function does not change the spill-over losses, which depend on the feed element dimensions and on the compensation system of the feed array itself.

A conventional reflector-feed system including a single feed is unable to compensate any reflector error; this is due to the fact that there is no additional degree of freedom; in fact, all the field values intercepted by the feed aperture are added together; therefore, there is no possibility of compensation considering them separately. The only freedom available is to optimise the reflector efficiency, the spill-over loss and the side-lobe level choosing a proper feed size.

Instead, the use of a feed array changes the way to consider the design of a given reflector edge taper, due to the fact that the feed array intercepts a wide area of the Airy interference disks: either the feed array element has the size to generate the wished edge taper or the full array contributes to generate the wished edge taper, maintaining the minimum feed size possible with an antenna system working in two frequency bands for transmission and reception.

The former system could be more intuitive but has the important drawback to have larger grating lobes and reduced capability of error compensation, due to the feed element integration on the feed aperture (larger than 0.5λ). This integration on the aperture has the effect of averaging errors and, consequently, reducing the feed array capability to compensate for reflector errors.

The latter system is based on the use of the full feed array to generate the reflector weighting function, without any kind of requirement on the feed element size apart the usual one for arrays.

In particular, the relation among the feed array, the focal plane field distribution and the reflector illumination is given, in first approximation, by the Fourier transform of the product of the reflector weighting function and the correction function generated by the feed array on the reflector itself.

In view of the foregoing, an aspect of the present invention provides for an optimization of the error correction matrix used in reception on the basis of a predefined RX edge tapering function and an optimization of the reflector-error-related matrix used in transmission on the basis of a predefined TX edge tapering function, wherein said RX and TX edge tapering function can be one and the same edge tapering function or different (e.g., one optimized for reception and one for transmission).

For example, the equation for computing electric field values on the focal plane in transmission can be conveniently modified to take into account a wished edge taper:

$$E_{FPtx}(k,j) \approx \sum_n \sum_m F(m,n) A\left(m\frac{a}{\lambda_{tx}}, n\frac{a}{\lambda_{tx}}\right) e^{j\beta\phi_{m,n}} e^{j2\pi(\alpha k\beta d\frac{a}{F}m + \alpha j\beta d\frac{a}{F}n)},$$

where the additional term F(m, n) is the tapering function of the electric field on the antenna aperture.

The introduction of the edge tapering function(s) does not have any impact on the reflector error correction capability.

13. Use of the Invention on Board Satellites

The reflector antenna according to the present invention may be advantageously used also on board satellites (in particular LEO satellites, but also MEO and GEO satellites). In fact, the reflector antenna according to the present invention allows obtaining an optimized, steerable coverage, long equivalent focal lengths and the capability to electronically compensate for mechanical reflector distortions, which features render the antenna solution according to the present invention extremely suitable for LEO, MEO and GEO satellites.

Moreover, dual-reflector configuration allows having compact antenna architectures and limiting the distortion effects of a low F/D ratio of the antenna.

Additionally, even with a limited number of radiating elements of the feed array, it is still possible to have a sufficient number of degrees of freedom for generating beams in desired directions and for minimizing interference.

In view of the foregoing, it is immediately evident the advantageous use of the present invention also on board LEO, MEO and GEO satellites.

Figure 18:
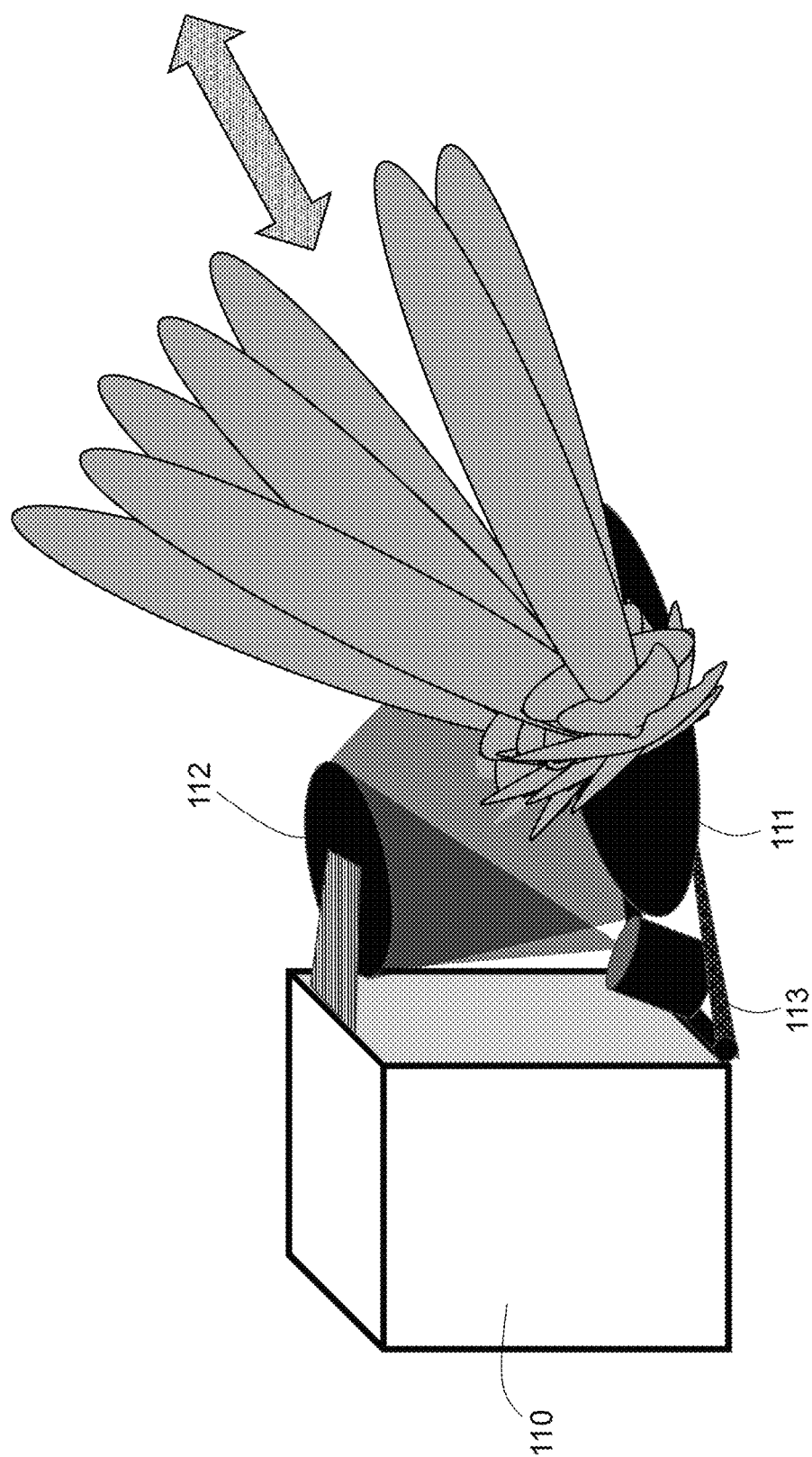
FIG. 18 schematically illustrates a LEO smallsat equipped with a reflector antenna according to an illustrative embodiment of the present invention.

In this connection, reference can be made to FIG. 18 that schematically illustrates a LEO smallsat (conveniently, a cubesat) 110 equipped with a reflector antenna according to the present invention including a main reflector 111, a sub-reflector 112 and a feed array 113.

14. Use of the Invention for SAR Applications

It is worth noting that the present invention can be advantageously exploited on board satellites, in particular for onboard reflector antennas of communications payloads or of synthetic aperture radars (SARs), where a feed array solution according to the present invention would enable the use of a reflector surface to be deployed with multiple beams. In fact, the feed array according to the present invention, in addition to generating a multiple beam configuration, can operate also to compensate surface errors related to the deployment of very large antennas.

In particular, a very interesting exploitation of the present invention for onboard antennas is represented by the SAR application. In fact, as previously explained, the feed array according to the present invention can not only generate a multiple beam configuration both in transmission and in reception, but can also compensate surface errors that usually affect very large antenna structures, such as deployable reflector antennas.

However, in this respect, it is worth noting that, in case of use of the present invention for satellite SAR antennas, error compensation cannot follow exactly the same procedure as in case of communication antennas, since the irradiated area on the ground is very large (typically a few kilometers) and, hence, the radiation pattern on the receiving antenna (i.e., the SAR antenna) is substantially in the near field of the illuminated Earth's surface area. Therefore, a periodical calibration of the reflector antenna of the SAR is required by using an active corner reflector arranged on the ground. In fact, in this way, the active corner reflector can be used to produce a plane wave in the direction of the SAR antenna allowing its calibration as in the case of the communication antennas.

Figure 19:
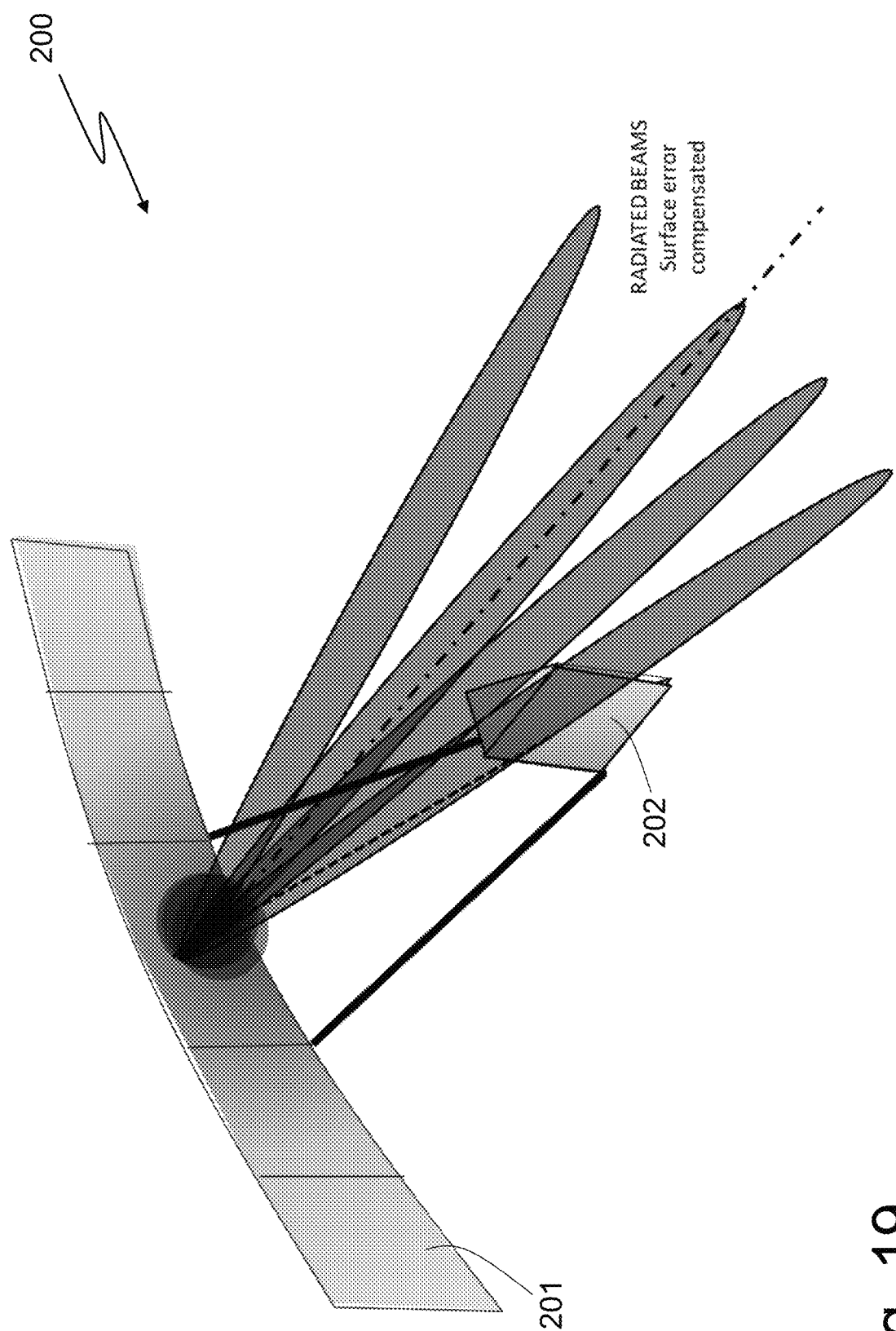
FIG. 19 schematically illustrates a single-reflector antenna of a satellite synthetic aperture radar (SAR) according to an illustrative embodiment of the present invention.
Figure 20:
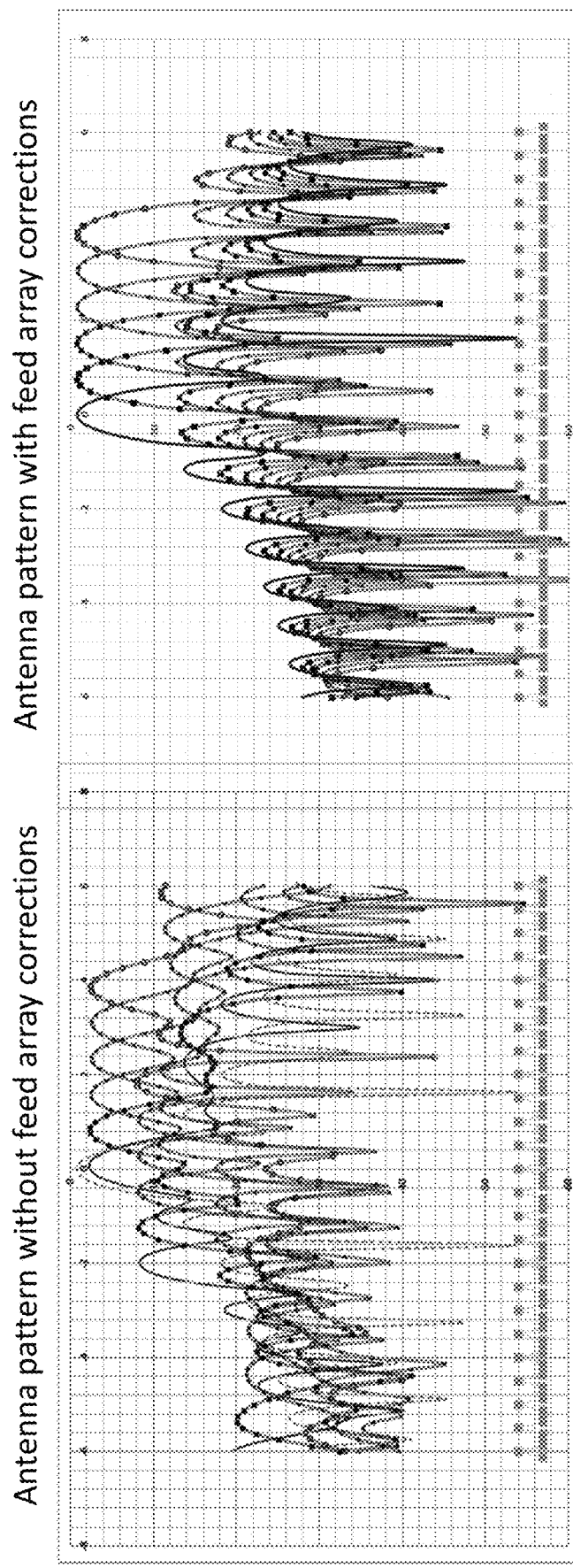
FIG. 20 shows antenna patterns of the single-reflector antenna of FIG. 19 with and without error compensation/correction.

In this connection, FIG. 19 schematically illustrates a single-reflector antenna 200 according to the present invention of a SAR installed on board a satellite (not shown for illustration simplicity), wherein said single-reflector antenna 200 includes a deployed reflector 201 and a feed array 202. Additionally, FIG. 20 shows antenna patterns of the single-reflector antenna 200 with and without error compensation/correction.

15. Closing Remarks

From the foregoing, the innovative features and the technical advantages of the present invention are immediately clear to those skilled in the art.

In particular, it is worth pointing out the following innovative features of the present invention:

- application of the feed array architecture to existing ground antenna infrastructures without substantial mechanical modifications;
- advantageous exploitation of the present invention also on board satellites (in particular LEO satellite, but also MEO and GEO satellites) for both telecommunications and SAR applications;
- a methodology for defining the amplitude and phase for each radiating element and for each weighting coefficient;
- fast tracking capability obtained using a fast electronic beam steering of the feed array in combination with the slow mechanical pointing thereby rendering possible the use of antennas designed for geostationary satellites for LEO satellites without heavy mechanical modifications;
- capability to compensate for antenna distortions due to manufacturing tolerances and assembly errors to get always the maximum performance, by using an original estimation technique of the weighting coefficients of the RX section;
- extension of said technique also to the TX section (where no plane wave is received) by extrapolating RX measurements and estimating the aperture distortions for the TX frequency;
- additionally, said technique is enhanced by the application of predefined reflector edge tapering functions, without negative effects on the reflector error correction capability;
- a new predictive maintenance technique to verify the antenna during time, without scanning the antenna but only receiving a plane wave from a known source.

In conclusion, it is clear that numerous modifications and variants can be made to the present invention, all falling within the scope of the invention, as defined in the appended claims.

In this connection, it is important to stress again the point that the present invention can be advantageously used with both dual-reflector and single-reflector optics, on the ground and on board satellites, for telecommunications and also for SAR applications.

In particular, with specific reference to single-reflector optics, it is worth noting that the combined use of an fast, fine electronic beam pointing and a slow, coarse mechanical antenna pointing, the feed array's capability to compensate for reflector distortions and to apply predefined edge tapering functions, and the use of multiple feed arrays to form different antenna subsystems are features that can be advantageously exploited with a single-reflector optics, both in a ground station for LEO/MEO/GEO satellites and on board telecommunications/SAR satellite.

Moreover, it is worth noting also that the present invention can be advantageously exploited also for generic ground terminals for satellite telecommunications (e.g., satellite communications terminals installed on trains).

The invention claimed is:

1. A feed array for reflector antennas, wherein said feed array is designed to be installed in a reflector antenna provided with either a single or dual reflector optics and includes:
   - a radiating array arranged in a focal region of the single/dual reflector optics and operable to transmit and receive radiofrequency signals;
   - digital beam forming means;
   - a reception conversion unit means connected between the radiating array and the digital beam forming means and designed to
     - apply a frequency down-conversion and an analog-to-digital conversion to incoming radiofrequency signals received by the radiating array thereby obtaining incoming digital signals, and provide the digital beam forming means with the incoming digital signals; and a transmission conversion unit connected between the radiating array and the digital beam forming means and designed to apply a digital-to-analog conversion and a frequency up-conversion to outgoing digital signals generated by the digital beam forming means thereby obtaining outgoing radiofrequency signals, and provide the radiating array with the outgoing radiofrequency signals to be transmitted by said radiating array;

characterized in that the digital beam forming means are configured to:

process the incoming digital signals by using a reception matrix defined based on a first matrix for beam pointing in reception and a second matrix for compensating for errors in reception due to the single/dual reflector optics; and generate the outgoing digital signals by using a transmission matrix defined based on a third matrix for beam pointing in transmission and a fourth matrix related to errors in transmission due to the single/dual reflector optics;

wherein said second and fourth matrices are computed based on electric field values measured by the radiating array in the focal region.

2. The feed array of claim 1, wherein:

the second matrix is computed to compensate for the errors in reception due to the single/dual reflector optics and also to apply a first edge tapering function to be used in reception; and the fourth matrix is designed to apply a second edge tapering function to be used in transmission.

3. The feed array according to claim 1, configured to compute the second matrix by:

measuring complex values of electric field in the focal region by means of the radiating array;

computing complex conjugate field phases based on the measured complex values of the electric field in the focal region; and computing the second matrix based on the complex conjugate field phases computed; said feed array being configured to compute the fourth matrix by:

estimating phase shifts related to distortions of the single/dual reflector optics on a basis of the measured complex values of the electric field in the focal region; and computing the fourth matrix based on the estimated phase shifts.

4. The feed array according to claim 1, wherein the radiating array includes a plurality of radiating elements operable both in reception and transmission, and wherein for each radiating element:

the first matrix includes a corresponding reception beam pointing coefficient to be applied to an incoming digital signal coming from said radiating element;

the second matrix includes a corresponding reflector error correction coefficient to be applied to the incoming digital signal coming from said radiating element;

the reception matrix includes a corresponding reception weighting coefficient to be applied to the incoming digital signal coming from said radiating element, wherein said corresponding reception weighting coefficient is defined based on said corresponding reception beam pointing and reflector error correction coefficients;

the digital beam forming means are configured to process the incoming digital signal coming from said radiating element by applying the corresponding reception weighting coefficient thereto;

the third matrix includes a corresponding transmission beam pointing coefficient to be applied to an outgoing digital signal intended to be transmitted by said radiating element;

the fourth matrix includes a corresponding reflector-error-related coefficient to be applied to the outgoing digital signal intended to be transmitted by said radiating element;

the transmission matrix includes a corresponding transmission weighting coefficient to be applied to the outgoing digital signal intended to be transmitted by said radiating element, wherein said corresponding transmission weighting coefficient is defined based on said corresponding transmission beam pointing and reflector-error-related coefficients; and the digital beam forming means are configured to generate the outgoing digital signal intended to be transmitted by said radiating element by applying the corresponding transmission weighting coefficient.

5. The feed array of claim 4, including for each radiating element:

a respective reception conversion unit connected between said radiating element and the digital beam forming means and designed to apply a low noise amplification, a frequency down-conversion and an analog-to-digital conversion to an incoming radiofrequency signal received by said radiating element thereby obtaining a corresponding incoming digital signal, and provide the digital beam forming means with said corresponding incoming digital signal; and a respective transmission conversion unit connected between said radiating element and the digital beam forming means and designed to apply a digital-to-analog conversion, a frequency up-conversion and a high power amplification to an outgoing digital signal generated by the digital beam forming means thereby obtaining a corresponding outgoing radiofrequency signal, and provide said radiating element with said corresponding outgoing radiofrequency signal to be transmitted thereby.

6. The feed array of claim 4, wherein the digital beam forming means includes reception digital beam forming means and transmission digital beam forming means, and wherein the feed array includes for each radiating element:

a respective reception conversion unit connected between said radiating element and the reception digital beam forming means and designed to apply a low noise amplification, a frequency down-conversion and an analog-to-digital conversion to an incoming radiofrequency signal received by said radiating element thereby obtaining a corresponding incoming digital signal, and provide the reception digital beam forming means with said corresponding incoming digital signal; and a respective transmission conversion unit connected between said radiating element and the transmission digital beam forming means and designed to apply a digital-to-analog conversion, a frequency up-conversion and a high power amplification to an outgoing digital signal generated by the transmission digital beam forming means thereby obtaining a corresponding outgoing radiofrequency signal, and provide said radiating element with said corresponding outgoing radiofrequency signal to be transmitted thereby.

7. The feed array according to claim 1, wherein the radiating array includes a plurality of first radiating elements operable in reception and a plurality of second radiating elements operable in transmission;

wherein for each first radiating element:
the first matrix includes a corresponding reception beam pointing coefficient to be applied to an incoming digital signal coming from said first radiating element;
the second matrix includes a corresponding reflector error correction coefficient to be applied to the incoming digital signal coming from said first radiating element;
the reception matrix includes a corresponding reception weighting coefficient to be applied to the incoming digital signal coming from said first radiating element, wherein said corresponding reception weighting coefficient is defined based on said corresponding reception beam pointing and reflector error correction coefficients; and
the digital beam forming means are configured to process the incoming digital signal coming from said first radiating element by applying the corresponding reception weighting coefficient thereto;

and wherein for each second radiating element:
the third matrix includes a corresponding transmission beam pointing coefficient to be applied to an outgoing digital signal intended to be transmitted by said second radiating element;
the fourth matrix includes a corresponding reflector-error-related coefficient to be applied to the outgoing digital signal intended to be transmitted by said second radiating element;
the transmission matrix includes a corresponding transmission weighting coefficient to be applied to the outgoing digital signal intended to be transmitted by said second radiating element, wherein said corresponding transmission weighting coefficient is defined based on said corresponding transmission beam pointing and reflector-error-related coefficients; and
the digital beam forming means are configured to generate the outgoing digital signal intended to be transmitted by said second radiating element by applying the corresponding transmission weighting coefficient.

8. The feed array of claim 7, including:
for each first radiating element, a respective reception conversion unit connected between said first radiating element and the digital beam forming means and designed to
apply a low noise amplification, a frequency down-conversion and an analog-to-digital conversion to an incoming radiofrequency signal received by said first radiating element thereby obtaining a corresponding incoming digital signal, and
provide the digital beam forming means with said corresponding incoming digital signal; and, for each second radiating element, a respective transmission conversion unit connected between said second radiating element and the digital beam forming means and designed to
apply a digital-to-analog conversion, a frequency up-conversion and a high power amplification to an outgoing digital signal generated by the digital beam forming means thereby obtaining a corresponding outgoing radiofrequency signal, and
provide said second radiating element with said corresponding outgoing radiofrequency signal to be transmitted thereby.

9. The feed array of claim 7, wherein the digital beam forming means includes reception digital beam forming means and transmission digital beam forming means, and wherein the feed array includes:
for each first radiating element, a respective reception conversion unit connected between said first radiating element and the reception digital beam forming means and designed to
apply a low noise amplification, a frequency down-conversion and an analog-to-digital conversion to an incoming radiofrequency signal received by said first radiating element thereby obtaining a corresponding incoming digital signal, and
provide the reception digital beam forming means with said corresponding incoming digital signal; and,
for each second radiating element, a respective transmission conversion unit connected between said second radiating element and the transmission digital beam forming means and designed to
apply a digital-to-analog conversion, a frequency up-conversion and a high power amplification to an outgoing digital signal generated by the transmission digital beam forming means thereby obtaining a corresponding outgoing radiofrequency signal, and
provide said second radiating element with said corresponding outgoing radiofrequency signal to be transmitted thereby.

10. The feed array according to claim 1, wherein the digital beam forming means comprise one or more beam forming networks based on Field Programmable Gate Array and/or Application-Specific Integrated Circuit technology/ies.

11. The feed array according to claim 6, wherein the reception digital beam forming means comprise one or more first beam forming networks based on Field Programmable Gate Array and/or Application-Specific Integrated Circuit technology/ies; and wherein the transmission digital beam forming means comprise one or more second beam forming networks based on Field Programmable Gate Array and/or Application-Specific Integrated Circuit technology/ies.

12. A reflector antenna designed to be installed in a ground station for satellites or on board a satellite, provided with a single or dual reflector optics, and equipped with the feed array as claimed in claim 1.

13. The reflector antenna of claim 12, comprising a mechanical pointing system operable to perform a mechanical pointing of the reflector antenna; wherein the feed array is configured to perform, by the digital beam forming means, an electronic beam pointing coordinated with the mechanical pointing.

14. The reflector antenna of claim 13, wherein the mechanical pointing system is operable to perform a slow, coarse mechanical pointing in elevation of the reflector antenna; and wherein the feed array is configured to perform, by the digital beam forming means, a fast, fine electronic multi-beam pointing in azimuth and elevation.

15. The reflector antenna according to claim 12, provided with a dual-reflector optics including:
   a single main reflector, and
   a single sub-reflector or a plurality of sub-reflectors;
   the reflector antenna) including a plurality of feed arrays, each of the plurality of feed arrays is arranged with respect to a respective portion of the single sub-reflector, or with respect to a respective one of the plurality of sub-reflectors, so as to form, along with a corresponding portion of the single main reflector, a respective dual-reflector antenna sub-system.

16. The reflector antenna according to claim 12, provided with a single-reflector optics including a single reflector; the reflector antenna including a plurality of feed arrays, each of the plurality of feed arrays is arranged with respect a respective portion of the single reflector so as to form therewith a respective single-reflector antenna sub-system.

17. The reflector antenna according to claim 15, wherein the respective dual-reflector antenna sub-system is:
   configured to operate at different frequency bands; and/or
   designed to point at different coverage regions.

18. A ground station for satellites, fitted with the reflector antenna as claimed in claim 12.

19. A satellite equipped with the reflector antenna as claimed in claim 12.

20. A satellite synthetic aperture radar system equipped with the reflector antenna as claimed in claim 12.

* * * * *